(12) United States Patent
Ogikubo et al.

(10) Patent No.: US 9,740,350 B2
(45) Date of Patent: Aug. 22, 2017

(54) CAPACITANCE TOUCH PANEL

(71) Applicant: FUJIFILM Corporation, Minato-ku, Tokyo (JP)

(72) Inventors: Shinya Ogikubo, Kanagawa (JP); Michihiro Shibata, Kanagawa (JP); Yasuhiro Mitamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 182 days.

(21) Appl. No.: 14/851,170

(22) Filed: Sep. 11, 2015

(65) Prior Publication Data
US 2016/0004356 A1 Jan. 7, 2016

Related U.S. Application Data

(63) Continuation of application No. PCT/JP2014/056776, filed on Mar. 13, 2014.

(30) Foreign Application Priority Data

Mar. 13, 2013 (JP) .................................. 2013-051048
Aug. 19, 2013 (JP) .................................. 2013-169681

(51) Int. Cl.
*G06F 3/044* (2006.01)
*B32B 27/00* (2006.01)
*G06F 3/041* (2006.01)
*B32B 7/12* (2006.01)

(52) U.S. Cl.
CPC ................ *G06F 3/044* (2013.01); *B32B 7/12* (2013.01); *B32B 27/00* (2013.01); *G06F 3/041* (2013.01); *B32B 2607/00* (2013.01)

(58) Field of Classification Search
CPC ......... G06F 3/044; G06F 3/041; B32B 27/00; B32B 7/12; B32B 2607/00
See application file for complete search history.

(56) References Cited

U.S. PATENT DOCUMENTS

2012/0094037 A1\* 4/2012 Banba ........................ C09J 7/00
428/1.5

FOREIGN PATENT DOCUMENTS

JP 2008-310551 A 12/2008

OTHER PUBLICATIONS

International Preliminary Report on Patentability and Written Opinion, mailed Sep. 24, 2015, issued in corresponding International Application No. PCT/JP2014/056776, 6 pages in English.
International Search Report for PCT/JP2014/056776 dated Jun. 3, 2014, 4 pages.

\* cited by examiner

*Primary Examiner* — Michael C Miggins
(74) *Attorney, Agent, or Firm* — Sughrue Mion, PLLC

(57) ABSTRACT

A capacitance touch panel includes a display, a lower adhesive layer, a capacitance touch panel sensor, an upper adhesive layer, and a protective substrate, which are formed in this order. A temperature dependency of relative permittivity in the upper adhesive layer and a temperature dependency of relative permittivity in the lower adhesive layer as determined by a temperature dependency evaluation test are both up to 30%.

14 Claims, 4 Drawing Sheets

CAPACITANCE TOUCH PANEL

CROSS-REFERENCE TO RELATED APPLICATIONS

This application is a Continuation of PCT International Application No. PCT/JP2014/056776 filed on Mar. 13, 2014, which claims priority under 35 U.S.C. §119(a) to Japanese Patent Application No. 2013-051048 filed on Mar. 13, 2013 and Japanese Patent Application No. 2013-169681 filed on Aug. 19, 2013. Each of the above application(s) is hereby expressly incorporated by reference, in its entirety, into the present application.

BACKGROUND OF THE INVENTION

The present invention relates to a capacitance touch panel and more specifically to a capacitance touch panel in which the relative permittivity of a lower adhesive layer and that of an upper adhesive layer satisfy predetermined relations.

In recent years, the rate of mounting a touch panel on mobile phones, portable game consoles and other devices is increasing, and for example, attention is focused on a capacitance touch panel capable of multipoint detection (JP 2008-310551 A).

SUMMARY OF THE INVENTION

In recent years, it is required to perform position detection with a higher degree of accuracy in order to meet the demand for an increase in screen size of a capacitance touch panel. On the other hand, such a capacitance touch panel is required to cause no malfunction in various usage environments including cold regions, warm regions and the like.

However, conventionally known capacitance touch panels did not necessarily satisfy the foregoing requirements and required further improvements because malfunctions were more likely to occur depending on the usage environment due to the increase in screen size.

Under these circumstances, an object of the present invention is to provide a capacitance touch panel which is less likely to cause malfunctions in a wide temperature environment from low temperatures to high temperatures.

The inventors of the present invention have made an intensive study on the foregoing problem and as a result found that changes in relative permittivity of adhesive layers included in a capacitance touch panel constitute a main factor of such malfunctions. The inventors of the present invention have further made the study based on this finding and found that the foregoing object can be achieved by the following configurations.

(1) A capacitance touch panel comprising: a display; a lower adhesive layer; a capacitance touch panel sensor; an upper adhesive layer; and a protective substrate, which are formed in this order, wherein a temperature dependency of relative permittivity in the upper adhesive layer and a temperature dependency of relative permittivity in the lower adhesive layer as determined by a temperature dependency evaluation test are both up to 30%, the temperature dependency evaluation test including sandwiching an adhesive layer between aluminum electrodes, increasing a temperature of the adhesive layer in increments of 20° C. from −40° C. to 80° C., calculating relative permittivity of the adhesive layer at respective temperatures by impedance measurement at 1 MHz, selecting a minimum value and a maximum value from the relative permittivity calculated at the respective temperatures and taking a value (%) determined from an expression [{(maximum value−minimum value)/minimum value}× 100] as a temperature dependency.

(2) The capacitance touch panel according to (1), wherein a minimum value of the relative permittivity A of the upper adhesive layer at respective temperatures set in increments of 20° C. from −40° C. to 80° C. is equal to or larger than a maximum value of the relative permittivity B of the lower adhesive layer at respective temperatures set in increments of 20° C. from −40° C. to 80° C.

(3) The capacitance touch panel according to (1) or (2), wherein the capacitance touch panel sensor is a laminate having detection electrodes provided on both surfaces of a substrate or a laminate obtained by bonding together, via an adhesive layer, detection electrode-bearing substrates each having detection electrodes formed on a surface of a substrate.

(4) The capacitance touch panel according to (3), wherein each of the detection electrodes comprises a material selected from the group consisting of gold, silver, copper, aluminum, ITO, tin oxide, zinc oxide, cadmium oxide, gallium oxide, titanium oxide, an alloy of silver and palladium, and an alloy of silver, palladium and copper.

(5) The capacitance touch panel according to any one of (1) to (4), wherein the temperature dependency of the relative permittivity in the upper adhesive layer or the temperature dependency of the relative permittivity in the lower adhesive layer as determined by the temperature dependency evaluation test is up to 20%.

(6) The capacitance touch panel according to any one of (1) to (5), wherein a display screen of the display has a size in a diagonal direction of 5 inches or more.

The present invention can provide a capacitance touch panel which is less likely to cause malfunctions in a wide temperature environment from low temperatures to high temperatures.

DETAILED DESCRIPTION OF THE INVENTION

The capacitance touch panel (hereinafter also referred to simply as "touch panel") of the invention will be described below with reference to preferred embodiments shown in the accompanying drawings.

The capacitance touch panel of the invention is characterized in that the relative permittivity of a lower adhesive layer and that of an upper adhesive layer are controlled. To be more specific, the capacitance touch panel of the invention is characterized in that the temperature dependency of the relative permittivity of the upper adhesive layer and the temperature dependency of the relative permittivity of the lower adhesive layer are up to predetermined values. Reasons why such a configuration brings about desired effects will be detailed below.

A device such as a mobile phone provided with a touch panel is exposed to various temperatures depending on the usage environment and is further required to respond even in environments where the temperature changes abruptly (e.g., from outside air in winter to a heated room, from the inside of a car in summer to an air-conditioned room). However, frequent malfunctions may occur. The inventors of the invention found that the relative permittivity of the upper adhesive layer and that of the lower adhesive layer considerably change depending on the temperature, which is a factor of the malfunctions. In other words, if the relative permittivity of the upper adhesive layer or the lower adhesive layer changes considerably depending on the temperature, the capacitance between detection electrodes is changed to easily deviate from an initially set value, thus leading to malfunctions. In addition, if a local temperature difference occurs depending on the environment temperature, the in-plane capacitance between detection electrodes is also considerably changed, leading to malfunctions. Then, malfunctions are suppressed by reducing the temperature dependency of the relative permittivity of the upper adhesive layer and that of the lower adhesive layer to low levels.

Figure 1:
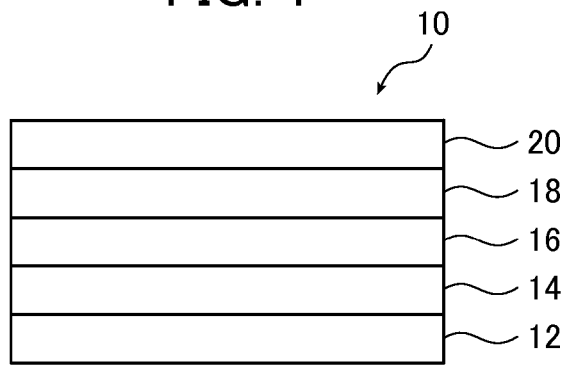
FIG. 1 is a cross-sectional view of an embodiment of a capacitance touch panel of the invention.

FIG. 1 is a schematic cross-sectional view of a capacitance touch panel of the invention. The drawings according to the invention are schematic views and the thickness relations and the positional relations between the respective layers do not necessarily coincide with actual ones.

As shown in FIG. 1, a capacitance touch panel 10 includes a display 12, a lower adhesive layer 14, a capacitance touch panel sensor 16, an upper adhesive layer 18, and a protective substrate 20, which are formed in this order. In the capacitance touch panel 10, when a finger is brought into proximity to or contact with the protective substrate 20, the capacitance between the finger and any of detection electrodes in the capacitance touch panel sensor 16 will change. Herein, a position detection driver (not shown) always detects changes in capacitance between the finger and any of the detection electrodes. Upon detection of a capacitance change of not less than a predetermined value, the position detection driver detects a position where the capacitance change was detected, as an input position. The capacitance touch panel 10 can thus detect the input position.

The respective members of the capacitance touch panel 10 will be described below in detail. Embodiments of the lower adhesive layer 14 and the upper adhesive layer 18 which are characteristic features of the invention will be first described in detail, which will be followed by a detailed description of other members.

(Lower Adhesive Layer)

The lower adhesive layer 14 is a layer for ensuring the adhesion between the display 12 to be described later and the capacitance touch panel sensor 16 to be described later.

In the lower adhesive layer 14, the temperature dependency of the relative permittivity as determined by a temperature dependency evaluation test to be described later is up to 30%. In particular, the temperature dependency is preferably up to 25%, more preferably up to 20%, even more preferably up to 15%, still even more preferably up to 10%, and most preferably up to 8% because the touch panel is much less likely to cause malfunctions. The lower limit is not particularly limited and is preferably at the lowest possible level and most preferably 0.

In a case where the temperature dependency of the relative permittivity exceeds 30%, the touch panel is more likely to cause malfunctions.

A method of performing the temperature dependency evaluation test will be described below in detail. The relative permittivity is measured using a technique for measuring the impedance at each temperature, which will be described later. This technique is generally called a "capacitance method." Conceptually, the capacitance method is a method in which a sample is sandwiched between electrodes to form a capacitor and the relative permittivity is calculated from the measured capacitance values.

Figure 2:
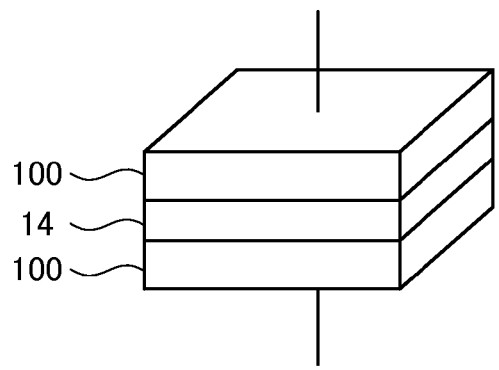
FIG. 2 is a schematic view of an evaluation sample that may be used in a temperature dependency evaluation test.

First of all, as shown in FIG. 2, the lower adhesive layer 14 as a measurement target (thickness: 100 to 500 µm) is sandwiched between a pair of aluminum electrodes 100 (electrode area: 20 mm×20 mm) and pressure degassing treatment is performed at 40° C. and 5 atm for 60 minutes to prepare an evaluation sample.

Then, the temperature of the lower adhesive layer in the sample is stepwise increased in increments of 20° C. from −40° C. to 80° C. and the capacitance C is determined at each temperature by the impedance measurement at 1 MHz using an impedance analyzer (4294A manufactured by Agilent Technologies). Thereafter, the thus determined capacitance C is multiplied by the thickness T of the lower adhesive layer and the resulting value is then divided by the product of the area S of the aluminum electrodes and the vacuum permittivity $\epsilon_0$ ($8.854\times10^{-12}$ F/m) to calculate the relative permittivity. In other words, the relative permittivity is calculated by an expression (X): relative permittivity= (capacitance C×thickness T)/(area S×vacuum permittivity $\epsilon_0$).

To be more specific, the temperature of the lower adhesive layer is increased stepwise so as to be −40° C., −20° C., 0° C., 20° C., 40° C., 60° C. and 80° C.; the lower adhesive layer is allowed to stand at each temperature for 5 minutes until its temperature is stabilized; the capacitance C is determined at each temperature by the impedance measurement at 1 MHz; and the relative permittivity at each temperature is calculated from the resulting value.

It should be noted that the thickness of the lower adhesive layer is expressed by a value obtained by measuring the thickness of the lower adhesive layer at least five arbitrary points and calculating the arithmetic mean of the measurements.

A minimum value and a maximum value are selected from the calculated relative permittivity values to determine the ratio of the difference between the two values to the minimum value. To be more specific, the value (%) calculated by an expression: [{(maximum value−minimum value)/minimum value}×100] is taken as the temperature dependency.

Figure 3:
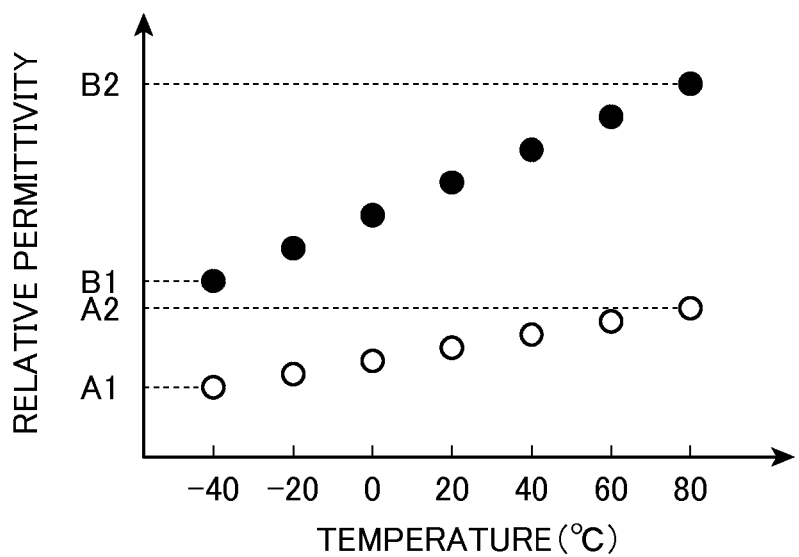
FIG. 3 shows exemplary results of the temperature dependency evaluation test.

FIG. 3 shows exemplary results of the temperature dependency evaluation test. The horizontal and vertical axes in FIG. 3 represent the temperature and relative permittivity, respectively. FIG. 3 shows exemplary measurement results of two types of adhesive layers, one of them indicated by white circles and the other by black circles.

Now referring to FIG. 3, as for an adhesive layer A indicated by white circles, the relative permittivity values at the respective temperatures are comparatively close to each other and the change rate is also low. In other words, the graph shows that the change rate of the relative permittivity of the adhesive layer A due to the temperature is low, and the relative permittivity of the adhesive layer A is less likely to change also in cold regions and warm regions. As a result, the capacitance between the detection electrodes is less likely to deviate from an initially set value and malfunctions do not easily occur. The temperature dependency (%) in the adhesive layer A can be determined by selecting A1 as the white circle minimum value and A2 as the white circle maximum value in FIG. 3 and calculating according to an expression: $[(A2−A1)/A1×100]$.

On the other hand, as for an adhesive layer B indicated by black circles, the higher the temperature is, the more the relative permittivity increases, and the change rate is high. In other words, the graph shows that the change rate of the relative permittivity of the adhesive layer B due to the temperature is high, and the capacitance between the detection electrodes is more likely to deviate from the initially set value and malfunctions easily occur. The temperature dependency (%) in the adhesive layer B can be determined by selecting B1 as the black circle minimum value and B2 as the black circle maximum value in FIG. 3 and calculating according to an expression: $[(B2−B1)/B1×100]$.

In other words, the temperature dependency indicates to what extent the permittivity changes due to the temperature. The smaller this value is, the less the relative permittivity is likely to change over the range from a low temperature (−40° C.) to a high temperature (80° C.). On the other hand, the larger this value is, the more the relative permittivity is likely to change over the range from the low temperature (−40° C.) to the high temperature (80° C.).

FIG. 3 corresponds to an embodiment in which the maximum value A2 among the relative permittivity values at the respective temperatures in the adhesive layer A is smaller than the minimum value B1 among the relative permittivity values at the respective temperatures in the adhesive layer B.

The magnitude of relative permittivity B of the lower adhesive layer 14 at the respective temperatures set in increments of 20° C. in a range of −40° C. to 80° C. is not particularly limited and is preferably up to 3.5 and more preferably up to 3.0 from the viewpoint that the touch panel is much less likely to cause malfunctions. The lower limit is not particularly limited and is preferably 2.2 or more in terms of adhesion.

The method of measuring the relative permittivity B is the same as the procedure of the above-described temperature dependency evaluation test.

The thickness of the lower adhesive layer 14 is not particularly limited, and is preferably 5 to 350 µm, more preferably 30 to 250 µm and even more preferably 30 to 150 µm. Within the foregoing range, a desired visible light transmittance is obtained and the lower adhesive layer is also easy to handle.

The lower adhesive layer 14 is preferably optically transparent. That is to say, the lower adhesive layer 14 is preferably a transparent adhesive layer. The term "optically transparent" intends that the total light transmittance is 85% or more. The total light transmittance is preferably 90% or more and more preferably 100%.

The type of the material making up the lower adhesive layer 14 is not particularly limited as long as the temperature dependency is satisfied. Examples thereof include an acrylic adhesive, a rubber adhesive and a silicone adhesive. The acrylic adhesive as used herein refers to an adhesive containing a polymer of an acrylic monomer and/or a methacrylic monomer ((meth)acrylic polymer). The acrylic adhesive contains the foregoing polymer as a base polymer but may contain other ingredients (e.g., a tackifier and a rubber ingredient which will be described later).

It should be noted that (meth)acrylic polymer is a concept including both acrylic and methacrylic polymers.

Examples of the monomer ((meth)acrylate monomer) that may be used to produce the (meth)acrylic polymer include methyl (meth)acrylate, ethyl (meth)acrylate, butyl (meth)acrylate, isobutyl(meth)acrylate, t-butyl (meth)acrylate, cyclohexyl(meth)acrylate, tetrahydrofurfuryl(meth)acrylate, 2-ethylhexyl(meth)acrylate, dodecyl(meth)acrylate, isononyl(meth)acrylate, isodecinonyl(meth)acrylate, stearyl(meth)acrylate, 2-hydroxyethyl(meth)acrylate, 2-hydroxypropyl (meth)acrylate, 2-hydroxybutyl(meth)acrylate, isobornyl (meth)acrylate, butoxy diethylene glycol(meth)acrylate, benzyl (meth)acrylate, dicyclohexyl(meth)acrylate, 2-dicyclohexyl oxyethyl(meth)acrylate, morpholino(meth)acrylamide, phenoxyethyl(meth)acrylate, dimethylaminoethyl (meth)acrylate, ethylene glycol di(meth)acrylate, 1,4-butanediol dimethacrylate, neopentyl glycol di(meth)acrylate, 1,6-hexanediol di(meth)acrylate, trimethylolpropane tri(meth)acrylate, nonanediol di(meth)acrylate, tris(2-acryloyloxyethyl) isocyanurate, 2-morpholinoethyl(meth)acrylate, 9-anthryl methacrylate, 2,2-bis(4-methacryloxyphenyl)propane, pentaerythritol tetra(meth)acrylate, dipentaerythritol hexa(meth)acrylate and trans-1,4-cyclohexanediol dimethacrylate.

It should be noted that "(meth)acrylate" is used herein to collectively refer to both acrylate and methacrylate.

A preferred embodiment of the lower adhesive layer 14 is an embodiment containing an acrylic adhesive. In particular, the lower adhesive layer 14 preferably contains a (meth)acrylic polymer having a recurring unit derived from a (meth)acrylate monomer which has a hydrocarbon group containing at least 4 carbon atoms. It should be noted that (meth)acrylate monomer is a concept including both acrylate and methacrylate monomers.

Examples of the (meth)acrylate monomer in which the number of carbon atoms is at least 4 include 2-ethylhexyl (meth)acrylate, n-octyl(meth)acrylate, isooctyl(meth)acrylate, n-nonyl(meth)acrylate, isononyl(meth)acrylate, n-decyl(meth)acrylate, isodecyl(meth)acrylate, n-dodecyl(meth)acrylate, n-tridecyl(meth)acrylate, n-tetradecyl(meth)acrylate, n-hexadecyl(meth)acrylate, stearyl(meth)acrylate, isobornyl(meth)acrylate, dicyclopentenyl(meth)acrylate, dicyclopentanyl(meth)acrylate, and dicyclopentenyloxyethyl(meth)acrylate.

Examples of the (meth)acylate monomer having an aliphatic hydrocarbon group containing at least 4 carbon atoms include a (meth)acrylate monomer having a chain aliphatic hydrocarbon group containing at least 4 carbon atoms, and a (meth)acrylate monomer having a cyclic aliphatic hydrocarbon group containing at least 4 carbon atoms. The number of carbon atoms is preferably at least 6, more preferably 6 to 20 and even more preferably 8 to 16 from the viewpoint that occurrence of touch panel malfunctions is further suppressed (this advantage is hereinafter also expressed simply as "in terms of more excellent effect of the invention."

A preferred example of the (meth)acrylic polymer includes a (meth)acrylic polymer having a recurring unit derived from a (meth)acrylate monomer having a chain aliphatic hydrocarbon group containing at least 4 carbon atoms, and a recurring unit derived from a (meth)acrylate monomer having a cyclic aliphatic hydrocarbon group containing at least 4 carbon atoms.

The (meth)acrylic polymer may contain a recurring unit derived from a monomer other than the above (for example, a carboxylic acid group-containing (meth)acrylate (e.g., acrylic acid), or a hydroxyl group-containing (meth)acrylate (e.g., 2-hydroxyethyl acrylate)) as long as the effects of the invention are not impaired.

In addition, the (meth)acrylic polymer may have a cross-linked structure. The method of forming the cross-linked structure is not particularly limited and exemplary methods include a method using a difunctional (meth)acrylate monomer and a method in which a reactive group (e.g., hydroxyl group) is introduced in a (meth)acrylic polymer and reacted with a crosslinking agent that may react with the reactive group. A specific example of the latter method include a method in which a (meth)acrylic polymer having a recurring unit derived from a (meth)acrylate monomer including at least one type of active hydrogen-containing group selected from the group consisting of hydroxyl group, primary amino group and secondary amino group is reacted with an isocyanate crosslinking agent (compound containing two or more isocyanate groups) to form an adhesive layer.

The (meth)acrylic polymer content in the lower adhesive layer 14 is not particularly limited and is preferably 10 to 100 wt %, more preferably 10 to 50 wt % and even more preferably 15 to 40 wt % in terms of more excellent effect of the invention.

The lower adhesive layer 14 may further contain a tackifier.

A patch or an agent known in the field of patch preparations may be appropriately selected and used as the tackifier. Examples thereof include petroleum resins (e.g., aromatic petroleum resin, aliphatic petroleum resin, aliphatic/aromatic-mixed petroleum resin, and C9 fraction-derived resin), terpene resins (e.g., α-pinene resin, β-pinene resin, resin obtained by copolymerizing a mixture of any of α-pinene/β-pinene/dipentene, terpene-phenol copolymer, hydrogenated terpene phenol resin, aromatic modified hydrogenated terpene resin, and abietic acid ester resin), rosin resins (e.g., partially hydrogenated gum rosin resin, erythritol-modified wood rosin resin, tall oil rosin resin, wood rosin resin, gum rosin, rosin-modified maleic acid resin, polymerized rosin, rosin phenol, and rosin ester), and coumarone-indene resins (e.g., coumarone-indene-styrene copolymer).

The tackifiers may be used alone or in combination of two or more thereof. When two or more tackifiers are used in combination, for example, different types of resins may be combined or resins of the same type which are different in softening point may be combined.

The tackifier content in the lower adhesive layer 14 is not particularly limited and is preferably 10 to 60 wt %, and more preferably 20 to 50 wt % in terms of more excellent effect of the invention.

The lower adhesive layer 14 may further contain a rubber ingredient (softening agent).

Examples of the rubber ingredient include polyolefins and modified polyolefins. Exemplary rubber ingredients include natural rubber, polyisobutylene, polybutadienes (modified liquid polybutadiene, and polymer of 1,4-butadiene, 1,2-butadiene or a mixture thereof for copolymerization), hydrogenated polyisoprene, hydrogenated polybutadiene, polyisoprene, polybutene, styrene-butadiene copolymer, and copolymer and polymer mixtures obtained by combinations arbitrarily selected from the group consisting of these rubber ingredients.

The rubber ingredient content in the lower adhesive layer 14 is not particularly limited and is preferably 20 to 75 wt %, and more preferably 25 to 60 wt % in terms of more excellent effect of the invention.

The total amount of urethane groups and urea groups contained in the (meth)acrylic polymer in the lower adhesive layer 14 is preferably less than 10 mmol, more preferably less than 9 mmol, even more preferably less than 8 mmol and most preferably less than 6 mmol with respect to 100 g of the adhesive layer in terms of more excellent effect of the invention. The lower limit is not particularly limited and is preferably 0 mmol. Exemplary urethane and urea groups include those derived from the material or generated by a crosslinking reaction.

The hydroxyl group content in the (meth)acrylic polymer in the lower adhesive layer 14 is preferably less than 11 mmol, more preferably less than 10 mmol, even more preferably less than 9 mmol, and most preferably less than 8.5 mmol with respect to 100 g of the adhesive layer in terms of more excellent effect of the invention. The lower limit is not particularly limited and is preferably 0 mmol.

The carboxylic acid group content in the (meth)acrylic polymer in the lower adhesive layer 14 is preferably less than 11 mmol, more preferably less than 9 mmol, even more preferably less than 7 mmol, and most preferably less than 6.5 mmol with respect to 100 g of the adhesive layer in terms of more excellent effect of the invention. The lower limit is not particularly limited and is preferably 0 mmol.

As a preferred embodiment of the (meth)acrylic polymer in the lower adhesive layer 14, the (meth)acrylic polymer in 100 g of the adhesive layer preferably contains urethane groups and urea groups in a total amount of less than 8 mmol, hydroxyl groups in an amount of less than 9 mmol and carboxylic acid groups in an amount of less than 7 mmol in terms of more excellent effect of the invention. It is particularly preferable for the (meth)acrylic polymer to contain no urethane group or urea group.

At least one type of active hydrogen-containing group selected from the group consisting of primary amino group, secondary amino group and amide group is contained in the (meth)acrylic polymer in the lower adhesive layer 14 in an amount of preferably less than 11 mmol, more preferably less than 10 mmol, and even more preferably less than 9 mmol with respect to 100 g of the adhesive layer.

A preferred embodiment of the lower adhesive layer 14 is an adhesive layer obtained by curing an adhesive composition containing a (meth)acrylate monomer which has a hydrocarbon group containing at least 8 carbon atoms. The (meth)acrylate monomer is as defined above.

The adhesive composition preferably contains the above-described tackifier.

The adhesive composition preferably further contains the above-described rubber ingredient. The adhesive composition may contain a polymerizable group-containing rubber ingredient as the rubber ingredient. To be more specific, a rubber ingredient selected from the group consisting of (meth)acryloyl group-containing rubber ingredients such as polybutadiene, polyisoprene, hydrogenated polybutadiene and hydrogenated polyisoprene may be used. In other words, the adhesive composition may contain a rubber ingredient containing a polymerizable group and a rubber ingredient containing no polymerizable group. Examples of the polymerizable group include known radical polymerizable groups (e.g., vinyl group, (meth)acryloyl group) and known cationic polymerizable groups (e.g., epoxy group).

The tackifier content in the adhesive composition is not particularly limited and is preferably 80 to 320 parts by weight and more preferably 120 to 270 parts by weight with respect to 100 parts by weight of the (meth)acrylate monomer.

The rubber ingredient content in the adhesive composition is not particularly limited and is preferably 70 to 320 parts by weight and more preferably 100 to 280 parts by weight with respect to 100 parts by weight of the (meth)acrylate monomer.

The adhesive composition may contain additives other than the above-described ingredients, as exemplified by a polymerization initiator, a thermosetting agent, an antioxidant, transparent particles, and a plasticizer.

Examples of the polymerization initiator that may be used include photopolymerization initiators such as (1-hydroxy) cyclohexyl phenyl ketone and acylphosphine oxide and thermal polymerization initiators such as azobisalkylnitrile and Perbutyl.

As the thermosetting agent, for example, a polyvalent isocyanate thermosetting agent or an epoxy or oxetane thermosetting agent is selected.

Examples of the antioxidant that may be used include known compounds such as hindered phenol (pentaerythritol tetrakis[3-(3,3-di-tert-butyl-4-hydroxyphenyl) propionate], 2,4-bis[(octyl thio)methyl]-o-cresol), and hindered amine.

Optically fine particles (e.g., nanosilica) which cannot be visually perceived can be appropriately used as the transparent particles unless they are contrary to the invention.

The procedure for manufacturing the adhesive layer from the foregoing adhesive composition is not particularly limited but any known method may be applied. An exemplary method involves applying the foregoing adhesive composition onto a predetermined substrate (e.g., a releasable substrate), optionally drying the applied adhesive composition, and subjecting the composition to curing treatment as described above.

Any known method may be used as the coating method and use is made of known coating devices such as an applicator, a gravure coater, a curtain coater, a comma coater, a slot die coater and a lip coater.

Examples of the curing treatment to which the adhesive composition is subjected include a photocuring treatment and a thermosetting treatment. In other words, an adhesive sheet is preferably formed by curing a photocuring adhesive or a thermosetting adhesive. As the adhesive composition (curable composition) for use in curing, use may be made of not only a monomer mixture but also an adhesive composition obtained by blending a polymer obtained by previous monomer polymerization with a monomer or a polymer having curing reactivity.

The photocuring treatment may be composed of several curing steps and the light wavelength to be used may be appropriately selected from among a plurality of wavelengths. The thermosetting treatment may also be composed of a plurality of curing steps and a heat application method may be selected from among suitable methods such as an oven, a reflow furnace and an IR heater. In addition, the photocuring treatment and the thermosetting treatment may be combined as appropriate.

In particular, formation of an adhesive sheet through photocuring treatment is preferable in terms of manufacturability, because the adhesive sheet is comparatively less likely to deform with time. In the case of photocuring treatment, a photocuring adhesive may contain a photopolymerization initiator.

(Upper Adhesive Layer)

The upper adhesive layer 18 is a layer for ensuring the adhesion between the capacitance touch panel sensor 16 to be described later and the protective substrate 20 to be described later.

In the upper adhesive layer 18, the temperature dependency of the relative permittivity as determined by the above-described temperature dependency evaluation test is up to 30%. In particular, the temperature dependency is preferably up to 25%, more preferably up to 20%, even more preferably up to 15%, still even more preferably up to 10%, and most preferably up to 8% because the touch panel is much less likely to cause malfunctions. The lower limit is not particularly limited and is preferably at the lowest possible level and most preferably 0.

In a case where the temperature dependency of the relative permittivity exceeds 30%, the touch panel is more likely to cause malfunctions.

The method of the temperature dependency evaluation test is as described above.

The magnitude of relative permittivity A of the upper adhesive layer 18 at the respective temperatures set in increments of 20° C. in a range of −40° C. to 80° C. is not particularly limited and is preferably up to 5.0, more preferably up to 4.0 and even more preferably 3.0 in consideration of the desire of chip set manufacturers to minimize a considerable departure from a conventionally set capacitance range and the tendency of each manufacturer toward reduction of the total device thickness from the viewpoint of the design of a chip set for driving a touch panel. The lower limit is not particularly limited and is preferably 2.5 or more for the same reason as above.

The method of measuring the relative permittivity A is the same as the procedure of the above-described temperature dependency evaluation test.

In addition, the minimum value of the relative permittivity A of the upper adhesive layer at the respective temperatures set in increments of 20° C. in the range of −40° C. to 80° C. is preferably equal to or larger than the maximum value of the relative permittivity B of the lower adhesive layer at the respective temperatures set in increments of 20° C. in the range of −40° C. to 80° C. According to this embodiment, the touch panel is much less likely to cause malfunctions.

The relative permittivity A of the upper adhesive layer 18 at the respective temperatures set in increments of 20° C. in the range of −40° C. to 80° C. and the relative permittivity B of the lower adhesive layer 14 at the respective temperatures set in increments of 20° C. in the range of −40° C. to 80° C. preferably satisfy the following relations. In short, at each temperature, the value of the relative permittivity A is equal to or larger than that of the relative permittivity B.

$$\text{Relative permittivity } A \geq \text{relative permittivity } B \quad \text{Expression (1):}$$

To be more specific, this means that the relative permittivity A of the upper adhesive layer (A (−40° C.), A (−20° C.) A (0° C.), A (20° C.), A (40° C.), A (60° C.), A (80° C.)) and the relative permittivity B of the lower adhesive layer (B (−40° C.), B (−20° C.), B (0° C.), B (20° C.), B (40° C.), B (60° C.), B (80° C.)) are measured at −40° C., −20° C., 0° C., 20° C., 40° C., 60° C. and 80° C. and, as a result of comparisons between the permittivity measurements at the same temperatures, seven relations shown below are satisfied.

$$\text{Relative permittivity } A \text{ (−40° C.)} \geq \text{relative permittivity } B \text{ (−40° C.)} \quad \text{Expression (1-1):}$$

$$\text{Relative permittivity } A \text{ (−20° C.)} \geq \text{relative permittivity } B \text{ (−20° C.)} \quad \text{Expression (1-2):}$$

$$\text{Relative permittivity } A \text{ (0° C.)} \geq \text{relative permittivity } B \text{ (0° C.)} \quad \text{Expression (1-3):}$$

Relative permittivity $A$ (20° C.)≥relative permittivity $B$ (20° C.)   Expression (1-4):

Relative permittivity $A$ (40° C.)≥relative permittivity $B$ (40° C.)   Expression (1-5):

Relative permittivity $A$ (60° C.)≥relative permittivity $B$ (60° C.)   Expression (1-6):

Relative permittivity $A$ (80° C.)≥relative permittivity $B$ (80° C.)   Expression (1-7):

A (° C.) (or B (° C.)) means a value of the relative permittivity A (or a value of the relative permittivity B) at each temperature.

If the above expression (1) is satisfied, the relative permittivity of the upper adhesive layer 18 is relatively larger than that of the lower adhesive layer 14 over the range from low temperatures to high temperatures, which enables suppression of influences of the display while maintaining good sensitivity to touching with a finger.

The thickness of the upper adhesive layer 18 is not particularly limited, and is preferably 5 to 350 μm, and more preferably 30 to 150 μm. Within the foregoing range, a desired visible light transmittance is obtained and the upper adhesive layer is also easy to handle.

The upper adhesive layer 18 is preferably optically transparent. That is to say, the upper adhesive layer 18 is preferably a transparent adhesive layer. The term "optically transparent" intends that the total light transmittance is 85% or more. The total light transmittance is preferably 90% or more and more preferably 100%.

The type of the material making up the upper adhesive layer 18 is not particularly limited as long as the temperature dependency is satisfied. Examples of the material include those making up the lower adhesive layer 14 as described above.

(Display)

The display 12 is a device having a display screen for displaying images and the respective members (e.g., the lower adhesive layer 14) are disposed on the display screen side.

The type of the display 12 is not particularly limited but any known display may be used. Examples thereof include a cathode ray tube (CRT) display, a liquid crystal display (LCD), an organic light-emitting diode (OLED) display, a vacuum fluorescent display (VFD), a plasma display panel (PDP), a surface-conduction electron-emitter display (SED), a field emission display (FED) and electronic paper (E-Paper).

(Protective Substrate)

The protective substrate 20 is a substrate disposed on the upper adhesive layer 18. The protective substrate 20 serves to protect the capacitance touch panel sensor 16 to be described later and the display 12 from the external environment and its main surface makes up a touch surface.

The protective substrate is preferably a transparent substrate and a plastic film, a plastic plate, a glass plate and the like are used. It is desirable to appropriately select the thickness of the substrate according to the intended use.

Exemplary materials of the plastic film and the plastic plate that may be used include: polyesters such as polyethylene terephthalate (PET) and polyethylene naphthalate (PEN); polyolefins such as polyethylene (PE), polypropylene (PP), polystyrene, and EVA; vinyl resin; as well as polycarbonate (PC), polyamide, polyimide, acrylic resin, triacetyl cellulose (TAC) and cycloolefin resin (COP).

A polarizing plate, a circularly polarizing plate or the like may be used for the protective substrate 20.

(Capacitance Touch Panel Sensor)

The capacitance touch panel sensor 16 is a sensor which is disposed on the display 12 (on the side closer to an operator) to detect the position of an external conductor such as a human finger, making use of changes in capacitance that may occur when the external conductor such as the human finger contacts (approaches) the touch panel.

Although the configuration of the capacitance touch panel sensor 16 is not particularly limited, the capacitance touch panel sensor 16 usually has detection electrodes (in particular detection electrodes extending in the X direction and detection electrodes extending in the Y direction) to detect changes in capacitance of detection electrodes contacted or approached by a finger, thereby specifying coordinates of the finger.

A preferred embodiment of the capacitance touch panel sensor 16 will be described below in detail with reference to FIG. 4.

Figure 4:
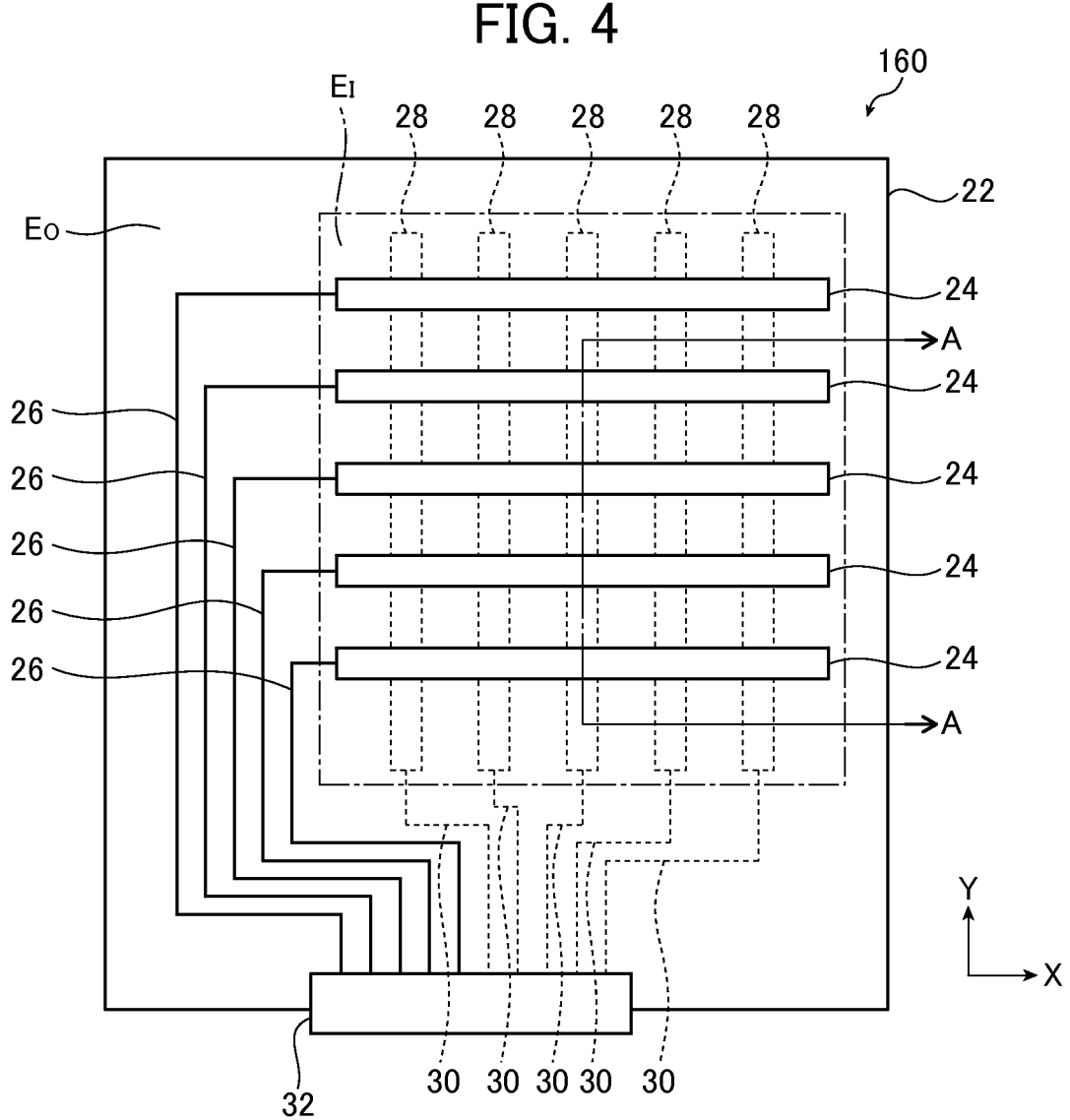
FIG. 4 is a plan view of an embodiment of a capacitance touch panel sensor.
Figure 5:
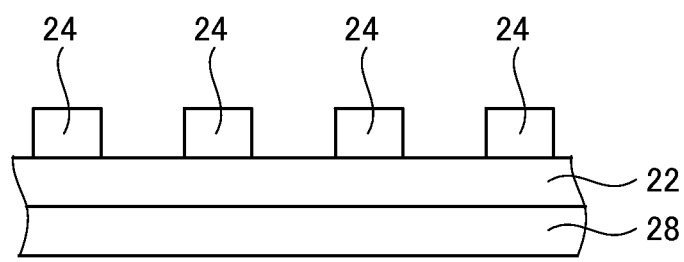
FIG. 5 is a cross-sectional view taken along section line A-A shown in FIG. 4.

FIG. 4 shows a plan view of a capacitance touch panel sensor 160. FIG. 5 is a cross-sectional view taken along section line A-A in FIG. 4. The capacitance touch panel sensor 160 includes a substrate 22, first detection electrodes 24 disposed on one main surface (front surface) of the substrate 22, first lead-out wiring lines 26, second detection electrodes 28 disposed on the other main surface (rear surface) of the substrate 22, second lead-out wiring lines 30 and a flexible printed circuit board 32. The region including the first detection electrodes 24 and the second detection electrodes 28 makes up an input region $E_I$ where a user is capable of input operations (an input region (sensing portion) where contact of an object is detectable), and the first lead-out wiring lines 26, the second lead-out wiring lines 30 and the flexible printed circuit board 32 are disposed in an outer region $E_O$ located outside the input region $E_I$.

The foregoing configuration will be described below in detail.

The substrate 22 is a member which serves to support the first detection electrodes 24 and the second detection electrodes 28 in the input region $E_I$ and which serves to support the first lead-out wiring lines 26 and the second lead-out wiring lines 30 in the outer region $E_O$.

It is preferable for light to appropriately penetrate the substrate 22. To be more specific, the substrate 22 preferably has a total light transmittance of 85 to 100%.

It is preferable for the substrate 22 to have insulation properties (to be an insulating substrate). In other words, the substrate 22 is a layer for ensuring the insulation properties between the first detection electrodes 24 and the second detection electrodes 28.

The substrate 22 is preferably a transparent substrate (in particular a transparent insulating substrate). Specific examples thereof include an insulating resin substrate, a ceramic substrate and a glass substrate. Of these, an insulating resin substrate is preferable for its excellent toughness.

More specifically, exemplary materials making up the insulating resin substrate include polyethylene terephthalate, polyether sulfone, polyacrylic resin, polyurethane resin, polyester, polycarbonate, polysulfone, polyamide, polyarylate, polyolefin, cellulose resin, polyvinyl chloride and cycloolefin resin. Of these, polyethylene terephthalate, cycloolefin resin, polycarbonate and triacetyl cellulose resin are preferable for their excellent transparency.

In FIG. 4, the substrate 22 has a single layer but may have two or more layers, that is, a plurality of layers.

The thickness of the substrate 22 (the total thickness if the substrate 22 has two or more layers, that is, a plurality of layers) is not particularly limited, and is preferably 5 to 350 µm, and more preferably 30 to 150 µm. Within the foregoing range, a desired visible light transmittance is obtained and the substrate is also easy to handle.

In FIG. 4, the shape of the substrate 22 seen from above is substantially rectangular but is not limited to this. For example, the substrate 22 may have a circular shape or a polygonal shape.

The first detection electrodes 24 and the second detection electrodes 28 are sensing electrodes for detecting changes of the capacitance, and make up a detecting portion (sensing portion). More specifically, the mutual capacitance between the first detection electrodes 24 and the second detection electrodes 28 changes upon contact of the tip of a finger with the touch panel, and the position of the tip of the finger is calculated by the integrated circuit (IC) based on the amount of change.

The first detection electrodes 24 serve to detect the input position in the X direction of a finger of a user having approached the input region $E_I$ and have the function of generating a capacitance between the finger and the input region $E_I$. The first detection electrodes 24 are electrodes which extend in a first direction (X direction) and are arranged at predetermined intervals in a second direction (Y direction) perpendicular to the first direction, and include a predetermined pattern as will be described later.

The second detection electrodes 28 serve to detect the input position in the Y direction of a finger of a user having approached the input region $E_I$ and have the function of generating a capacitance between the finger and the input region $E_I$. The second detection electrodes 28 are electrodes which extend in the second direction (Y direction) and are arranged at predetermined intervals in the first direction (X direction), and include a predetermined pattern as will be described later. In FIG. 4, the numbers of the first detection electrodes 24 and the second detection electrodes 28 are each 5. However, the numbers are not particularly limited as long as more than one first detection electrode and more than one second detection electrode are used.

Figure 6:
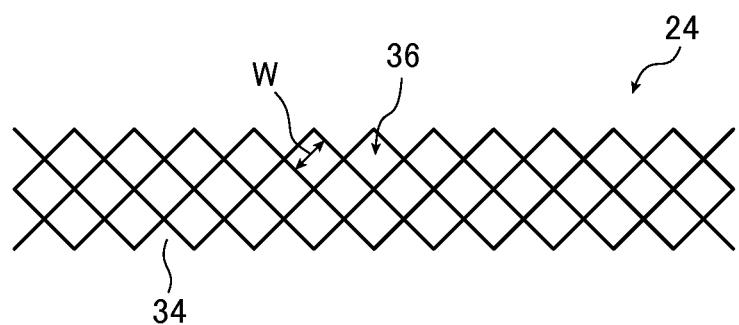
FIG. 6 is an enlarged plan view of a first detection electrode.

In FIG. 4, each of the first detection electrodes 24 and the second detection electrodes 28 is made up of conductive thin wires. FIG. 6 shows a partially enlarged plan view of the first detection electrode 24. As shown in FIG. 6, each of the first detection electrodes 24 is made up of conductive thin wires 34 and includes a plurality of lattices 36 formed by the intersecting conductive thin wires 34. As in the first detection electrodes 24, each of the second detection electrodes 28 also includes a plurality of lattices 36 formed by the intersecting conductive thin wires 34.

Exemplary materials of the conductive thin wires 34 include metals such as gold (Au), silver (Ag), copper (Cu), aluminum (Al), and palladium (Pd); alloys such as a silver-palladium alloy and a silver-palladium-copper alloy; metal oxides such as ITO, tin oxide, zinc oxide, cadmium oxide, gallium oxide and titanium oxide. Of these, silver is preferable because the conductive thin wires 34 exhibit excellent electrical conductivity.

The conductive thin wires 34 preferably contain a binder in terms of the adhesion between the conductive thin wires 34 and the substrate 22.

The binder is preferably a water-soluble polymer because the adhesion between the conductive thin wires 34 and the substrate 22 is more excellent. Exemplary types of the binder include gelatin, carrageenan, polyvinyl alcohol (PVA), polyvinyl pyrrolidone (PVP), starch and other polysaccharides, cellulose and its derivatives, polyethylene oxide, polyvinylamine, chitosan, polylysine, polyacrylic acid, polyalginic acid, polyhyaluronic acid, carboxycellulose, gum arabic, and sodium alginate. Of these, gelatin is preferable because the adhesion between the conductive thin wires 34 and the substrate 22 is more excellent.

Gelatin used may be lime-processed or acid-processed; it is also possible to use gelatin hydrolyzates, gelatin enzymolyzates, or gelatins modified with an amino group or a carboxyl group (e.g. phthalated or acetylated gelatin).

The volume ratio between the metal and the binder in the conductive thin wires 34 (volume of the metal/volume of the binder) is preferably at least 1.0 and more preferably at least 1.5. The electrical conductivity of the conductive thin wires 34 can be enhanced by adjusting the volume ratio between the metal and the binder to 1.0 or more. Although the upper limit is not particularly limited, the volume ratio is preferably up to 6.0, more preferably up to 4.0 and even more preferably up to 2.5 in terms of productivity.

The volume ratio between the metal and the binder can be calculated by the densities of the metal and the binder contained in the conductive thin wires 34. When the metal is silver and the binder is gelatin, the volume ratio is determined by calculating using the silver density of 10.5 g/cm$^3$ and the gelatin density of 1.34 g/cm$^3$.

The width of the conductive thin wires 34 is not particularly limited and is preferably up to 30 µm, more preferably up to 15 µm, even more preferably up to 10 µm, still even more preferably up to 9 µm, and most preferably up to 7 µm, and preferably at least 0.5 µm and more preferably at least 1.0 µm because low-resistance electrodes can be comparatively easily formed.

The thickness of the conductive thin wires 34 is not particularly limited and is selectable in a range of 0.00001 mm to 0.2 mm in terms of electrical conductivity and visibility, but is preferably up to 30 µm, more preferably up to 20 µm, even more preferably 0.01 to 9 µm, and most preferably 0.05 to 5 µm.

Each lattice 36 includes an opening region surrounded by the conductive thin wires 34. Each lattice 36 preferably has a one-side length W of up to 800 µm and more preferably up to 600 µm, and preferably at least 400 µm.

The first detection electrodes 24 and the second detection electrodes 28 preferably have an opening ratio of at least 85%, more preferably at least 90% and most preferably at least 95% in terms of visible light transmittance. The "opening ratio" corresponds to a ratio to the total of permeable portions in a predetermined region except the conductive thin wires 34 in the first detection electrodes 24 or the second detection electrodes 28.

Each lattice 36 has a generally rhomboid shape. However, each lattice 36 may have any of other polygonal shapes (e.g., a triangular shape, a quadrangular shape, a hexagonal shape and a random polygonal shape). The one-side shape may be linear, curved or arc-like. In the case of an arc-like shape, for example, a pair of opposite two sides may have an outwardly projecting arc-like shape and the other pair of opposite two sides an inwardly projecting arc-like shape. Alternatively, each side may have such a wavy shape that an outwardly projecting arc-like shape is continuous with an inwardly projecting arc-like shape. Of course, each side may have a sine curve shape.

In FIG. 6, the conductive thin wires 34 are formed in a mesh pattern but the pattern is not limited to this embodiment but may be a stripe pattern.

In FIG. 4, the first detection electrodes 24 and the second detection electrodes 28 are made up of a mesh structure of the conductive thin wires 34. However, the configuration is not limited to this embodiment but the whole of the first detection electrodes 24 and the second detection electrodes 28 may be formed from a thin film of a metal oxide such as ITO or ZnO (a transparent metal oxide thin film). The conductive thin wires 34 of the first detection electrodes 24 and the second detection electrodes 28 may be made up of metal oxide particles, metal pastes such as silver paste and copper paste, and metal nanowire particles such as silver nanowires and copper nanowires. Of these, silver nanowires are preferable in terms of their excellent electrical conductivity and transparency.

Electrode patterning may be selected according to the electrode material used, and a photolithographic process, a resist mask screen printing-etching process, an inkjet process, and a printing process may be used.

The first lead-out wiring lines 26 and the second lead-out wiring lines 30 are members which serve to apply voltage to the first detection electrodes 24 and the second detection electrodes 28, respectively.

The first lead-out wiring lines 26 are disposed on the substrate 22 in the outer region $E_O$. One end of each first lead-out wiring line 26 is electrically connected to its corresponding first detection electrode 24 and the other end thereof is electrically connected to the flexible printed circuit board 32.

The second lead-out wiring lines 30 are disposed on the substrate 22 in the outer region $E_O$. One end of each second lead-out wiring line 30 is electrically connected to its corresponding second detection electrode 28 and the other end thereof is electrically connected to the flexible printed circuit board 32.

In FIG. 4, the numbers of the first lead-out wiring lines 26 and the second lead-out wiring lines 30 are each 5 but are not particularly limited. A plurality of wiring lines are usually disposed according to the number of the detection electrodes used.

Exemplary wiring line materials making up the first lead-out wiring lines 26 and the second lead-out wiring lines 30 include metals such as gold (Au), silver (Ag), and copper (Cu); and metal oxides such as tin oxide, zinc oxide, cadmium oxide, gallium oxide and titanium oxide. Of these, silver is preferable in terms of its excellent electrical conductivity. The first lead-out wiring lines 26 and the second lead-out wiring lines 30 may be made up of any of metal pastes such as silver paste and copper paste, and thin films of metals such as aluminum (Al), molybdenum (Mo) and palladium (Pd) and alloys. In the case of the metal pastes, a screen printing process and an inkjet printing process are used with advantage, and in the case of the metal and alloy thin films, a process of patterning a film formed by sputtering, as exemplified by a photolithographic process is used with advantage.

The first lead-out wiring lines 26 and the second lead-out wiring lines 30 preferably contain a binder because the adhesion between the wiring lines and the substrate 22 is more excellent. The type of the binder is as described above.

The flexible printed circuit board 32 is a board having wiring lines and terminals formed on the substrate. The board is connected to the other end of each of the first lead-out wiring lines 26 and the other end of each of the second lead-out wiring lines 30 and serves to connect the capacitance touch panel sensor 160 with an external device (e.g., a display).

Since the number of operating lines (the number of detection electrodes) increases with increasing size in the diagonal direction of the input region capable of detecting contact of an object with the capacitance touch panel sensor, the time required for scanning per line is to be compressed. It is essential to reduce the parasitic capacitance of the capacitance touch panel sensor and the amount of changes due to the temperature in order to keep a suitable sensing environment in mobile use. In a conventional adhesive layer, the relative permittivity has a large temperature dependency and the sensing program may not follow (may cause malfunctions) with increasing size. On the other hand, in a case where the above-described adhesive layers showing a small temperature dependency of the relative permittivity are used as in the present invention, a suitable sensing environment is obtained if the size in the diagonal direction of the input region (sensing portion) capable of detecting contact of an object with the capacitance touch panel sensor is more than 5 inches. It is possible to exhibit high effects on suppressing malfunctions when the size is more preferably at least 8 inches and even more preferably at least 10 inches. The input region having the foregoing size has a rectangular shape.

(Method of Manufacturing Capacitance Touch Panel Sensor)

The method of manufacturing the capacitance touch panel sensor 160 is not particularly limited and any known method may be applied. An exemplary method involves exposing and developing photoresist films on metal foil as formed on both main surfaces of the substrate 22 to form resist patterns and etching the metal foil exposed from the resist patterns. Another exemplary method involves printing paste containing metal fine particles or metal nanowires on both main surfaces of the substrate 22 and subjecting the paste to metal plating. Other exemplary methods include a method of printing on the substrate 22 using a screen printing plate or a gravure printing plate, and a method of forming through an inkjet process.

In addition to the foregoing methods, a method using a silver halide may be used. To be more specific, an exemplary method includes a step (1) in which a silver halide emulsion layer (hereinafter also referred to simply as "photosensitive layer") containing a silver halide and a binder is formed on both surfaces of the substrate 22 and a step (2) in which the photosensitive layer is exposed to light and is then developed.

The respective steps will be described below.

[Step (1): Photosensitive Layer-Forming Step]

The step (1) is a step in which a photosensitive layer containing a silver halide and a binder is formed on both surfaces of the substrate 22.

The method of forming the photosensitive layer is not particularly limited and a method in which a composition for forming the photosensitive layer containing a silver halide and a binder is brought into contact with the substrate 22 to form the photosensitive layer on both surfaces of the substrate 22 is preferable in terms of productivity.

An embodiment of the composition for forming the photosensitive layer as used in the foregoing method will be detailed below and the step procedure will be then detailed below.

The composition for forming the photosensitive layer contains a silver halide and a binder.

The halogen element to be contained in the silver halide may be chlorine, bromine, iodine or fluorine, and these elements may be used in combination. As the silver halide, for example, a silver halide primarily composed of silver chloride, silver bromide or silver iodide is preferably used and a silver halide primarily composed of silver bromide or silver chloride is more preferably used.

The type of the binder that may be used is as described above. The binder may be contained in the composition for forming the photosensitive layer in the form of latex.

The volume ratio between the silver halide and the binder contained in the composition for forming the photosensitive layer is not particularly limited and is appropriately adjusted so that the volume ratio between the metal and the binder in the conductive thin wires 34 falls within the above-described preferable range.

The composition for forming the photosensitive layer optionally contains a solvent.

Examples of the solvent that may be used include water, organic solvents (such as alcohols (e.g. methanol), ketones (e.g. acetone), amides (e.g. formamide), sulfoxides (e.g. dimethyl sulfoxide), esters (e.g. ethyl acetate) and ethers); ionic liquids; and solvent mixtures thereof.

The solvent may be used in any amount without particular limitation and the solvent content is preferably in a range of 30 to 90 wt % and more preferably 50 to 80 wt % with respect to the total weight of the silver halide and the binder.

(Step Procedure)

The method of bringing the composition for forming the photosensitive layer into contact with the substrate 22 is not particularly limited and any known method may be employed. Exemplary methods include a method which involves applying the composition for forming the photosensitive layer to the substrate 22 and a method which involves immersing the substrate 22 in the composition for forming the photosensitive layer.

The binder content in the photosensitive layer formed is not particularly limited and is preferably 0.3 to 5.0 $g/m^2$ and more preferably 0.5 to 2.0 $g/m^2$.

The silver halide content in the photosensitive layer is not particularly limited and is preferably 1.0 to 20.0 $g/m^2$ and more preferably 5.0 to 15.0 $g/m^2$ in terms of silver because the conductive thin wires 34 have more excellent electrical conductivity.

A protective layer made up of a binder may be optionally further formed on the photosensitive layer. The abrasion resistance and the mechanical properties are improved by forming the protective layer.

[Step (2): Exposure/Development Step]

The step (2) is a step in which the photosensitive layer obtained in the step (1) is subjected to pattern exposure and its subsequent development process to form the first detection electrodes 24 and the first lead-out wiring lines 26 as well as the second detection electrodes 28 and the second lead-out wiring lines 30.

The pattern exposure process will be first described below in detail and the development process will be then described in detail.

(Pattern Exposure)

By subjecting the photosensitive layer to pattern exposure, the silver halide in the photosensitive layer in an exposed region forms a latent image. In the region having the latent image formed therein, the detection electrodes and the lead-out wiring lines are formed by the development process to be described later. On the other hand, in an unexposed region which was not exposed to light, the silver halide dissolves during the fixing process to be described later and flows out from the photosensitive layer to obtain a transparent film.

The light source that may be used in exposure is not particularly limited and examples thereof include light such as visible light and ultraviolet light and radiation such as X-rays.

The pattern exposure method is not particularly limited and the method may be performed, for example, by surface exposure using a photomask or scanning exposure with laser beams. The pattern shape is not particularly limited and is appropriately adjusted according to the pattern of conductive thin wires to be formed.

(Development Process)

The development method is not particularly limited and any known method may be applied. For example, use may be made of common development techniques for use in silver halide photographic films, printing paper, films for making printing plates, emulsion masks for photomasks, and the like.

The type of the developer that may be used during the development process is not particularly limited and, for example, developers such as a PQ developer, an MQ developer and an MAA developer may also be used. As the commercial products, use may be made of developers such as CN-16, CR-56, CP45X, FD-3 and PAPITOL formulated by FUJIFILM Corporation and C-41, E-6, RA-4, D-19 and D-72 formulated by Eastman Kodak Company as well as developers contained in their kits. Lith film developers may also be used.

The development process may include a fixing process performed for the purpose of stabilization by removal of the silver halide in the unexposed portions. Fixing techniques for use in silver halide photographic films, printing paper, films for making printing plates, emulsion masks for photomasks, and the like may be used in the fixing process.

The fixing temperature in the fixing step is preferably about 20° C. to about 50° C. and more preferably 25 to 45° C. The fixing time is preferably 5 seconds to 1 minute, and more preferably 7 seconds to 50 seconds.

The content ratio of the weight of silver metal contained in the exposed portions after the development process (detection electrodes and lead-out wiring lines) to the weight of silver contained in the portions to be exposed to light is preferably at least 50 wt % and more preferably at least 80 wt %. The content ratio of the weight of silver contained in the exposed portions to the weight of silver contained in the portions to be exposed is preferably at least 50 wt % because high electrical conductivity can be obtained.

In addition to the foregoing steps, an undercoat layer-forming step, an antihalation layer-forming step or a heating treatment to be described below may optionally be performed.

(Undercoat Layer-Forming Step)

The step (1) is preferably preceded by a step of forming an undercoat layer containing the binder on both the surfaces of the substrate 22 because the adhesion between the substrate 22 and the silver halide emulsion layers is excellent.

The binder that may be used is as described above. The thickness of the undercoat layer is not particularly limited and is preferably 0.01 to 0.5 μm and more preferably 0.01 to 0.1 μm in terms of the adhesion and further suppressed change rate of the mutual capacitance.

(Antihalation Layer-Forming Step)

The step (1) is preferably preceded by a step of forming an antihalation layer on both the surfaces of the substrate 22 in terms of making the conductive thin wires 34 thinner.

(Step (3): Heating Step)

The step (3) is an optionally performed heating step following the development process. This step is performed to cause fusion bonding of the binder to thereby further increase the hardness of the detection electrodes and the lead-out wiring lines. Particularly in a case where polymer particles are dispersed as the binder in the composition for forming the photosensitive layer (in a case where the binder is in the form of polymer particles in latex), this step is performed to cause fusion bonding between the polymer particles, thereby forming detection electrodes and lead-out wiring lines exhibiting desired hardness.

Suitable heating treatment conditions are selected as appropriate according to the binder used and the heating temperature is preferably at least 40° C. in terms of the film forming temperature of the polymer particles, and is more preferably at least 50° C. and even more preferably at least 60° C. The heating temperature is preferably up to 150° C. and more preferably up to 100° C. in terms of suppressing substrate curling and the like.

The heating time is not particularly limited and is preferably 1 to 5 minutes and more preferably 1 to 3 minutes in terms of suppressing substrate curling and the like in addition to the productivity.

In general, this heating treatment can also serve as the drying step which follows the exposure and development process. So, there is no need to increase a new step for forming the polymer particles into a film and this treatment is excellent in terms of productivity, costs and other factors.

This step is performed to form binder-containing light-permeable portions between adjacent detection electrodes (between adjacent conductive thin wires 34) and adjacent lead-out wiring lines. The light-permeable portions have a transmittance, as indicated by the minimum value of the transmittance in a wavelength range of 380 to 780 nm, of at least 90%, preferably at least 95%, more preferably at least 97%, even more preferably at least 98% and most preferably at least 99%.

The light-permeable portions may contain materials other than the foregoing binder, as exemplified by a solvent in which silver is poorly soluble.

The embodiment of the capacitance touch panel sensor is not limited to that shown in FIG. 4 and other embodiments may be applied.

Figure 7:
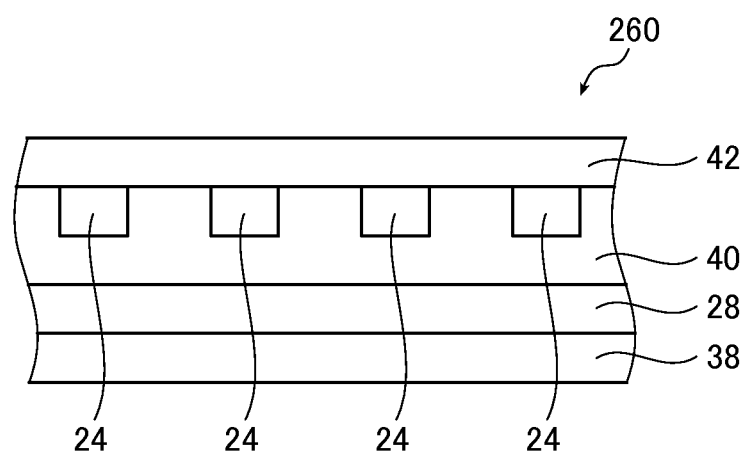
FIG. 7 is a partial cross-sectional view of another embodiment of the capacitance touch panel sensor.

For example, as shown in FIG. 7, a capacitance touch panel sensor 260 includes a first substrate 38, second detection electrodes 28 disposed on the first substrate 38, second lead-out wiring lines (not shown) each electrically connected to one end of each of the second detection electrodes 28 and disposed on the first substrate 38, an adhesive layer 40, first detection electrodes 24, first lead-out wiring lines (not shown) each electrically connected to one end of each of the first detection electrodes 24, a second substrate 42 to which the first detection electrodes 24 and the first lead-out wiring lines are adjacent, and a flexible printed circuit board (not shown).

As shown in FIG. 7, the capacitance touch panel sensor 260 has the same configuration as the capacitance touch panel sensor 160 except for the first substrate 38, the second substrate 42 and the adhesive layer 40. So, like components are denoted by the same reference numerals and their description will be omitted.

The definitions of the first substrate 38 and the second substrate 42 are the same as that of the above-described substrate 22.

The adhesive layer 40 is a layer for closely attaching the first detection electrodes 24 and the second detection electrodes 28 and is preferably optically transparent (is preferably a transparent adhesive layer). Known materials are used as the materials making up the adhesive layer 40.

The number of the first detection electrodes 24 and that of the second detection electrodes 28 in FIG. 7 are each more than one as shown in FIG. 4 and the first detection electrodes 24 and the second detection electrodes 28 are disposed so as to be orthogonal to each other as shown in FIG. 4.

The capacitance touch panel sensor 260 shown in FIG. 7 corresponds to a capacitance touch panel sensor obtained by preparing two electrode-bearing substrates each having a substrate as well as detection electrodes and lead-out wiring lines disposed on a surface of the substrate, and bonding the electrode-bearing substrates together via an adhesive layer so that the electrodes on one of the substrates are in a face-to-face relationship with the electrodes on the other.

Figure 8:
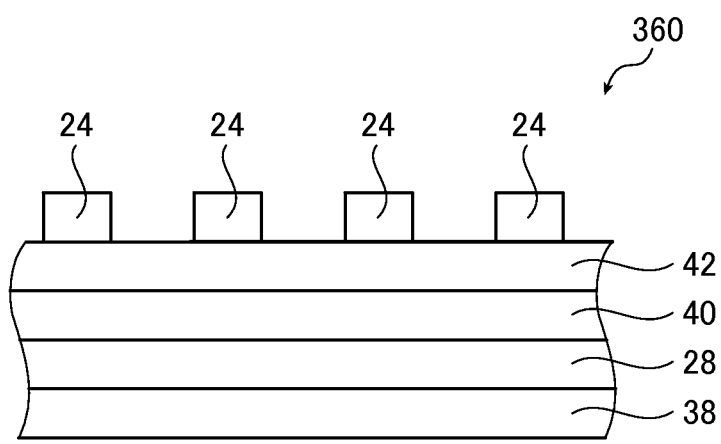
FIG. 8 is a partial cross-sectional view of still another embodiment of the capacitance touch panel sensor.

The embodiment shown in FIG. 8 is still another embodiment of the capacitance touch panel sensor.

A capacitance touch panel sensor 360 includes a first substrate 38, second detection electrodes 28 disposed on the first substrate 38, second lead-out wiring lines (not shown) each electrically connected to one end of each of the second detection electrodes 28 and disposed on the first substrate 38, an adhesive layer 40, a second substrate 42, first detection electrodes 24 disposed on the second substrate 42, first lead-out wiring lines (not shown) each electrically connected to one end of each of the first detection electrodes 24 and disposed on the second substrate 42, and a flexible printed circuit board (not shown).

The capacitance touch panel sensor 360 shown in FIG. 8 has the same layers as the capacitance touch panel sensor 260 shown in FIG. 7 except that the respective layers are formed in a different order. So, like components are denoted by the same reference numerals and their description will be omitted.

The number of the first detection electrodes 24 and that of the second detection electrodes 28 in FIG. 8 are each more than one as shown in FIG. 4 and the first detection electrodes 24 and the second detection electrodes 28 are disposed so as to be orthogonal to each other as shown in FIG. 4.

The capacitance touch panel sensor 360 shown in FIG. 8 corresponds to a capacitance touch panel sensor obtained by preparing two electrode-bearing substrates each having a substrate as well as detection electrodes and lead-out wiring lines disposed on a surface of the substrate, and bonding the electrode-bearing substrates together via an adhesive layer so that the substrate in one of the electrode-bearing substrates is in a face-to-face relationship with the electrodes in the other.

(Method of Manufacturing Touch Panel)

The method of manufacturing the above-described capacitance touch panel 10 is not particularly limited and any known method may be applied.

First, exemplary methods for forming the upper adhesive layer 18 on the capacitance touch panel sensor 16 include a method which involves bonding an adhesive layer sheet (a so-called optically clear adhesive (OCA) film) onto the capacitance touch panel sensor 16 and a method which involves applying an adhesive layer-forming liquid composition (a so-called UV curable adhesive or an optically clear adhesive resin (OCR)) onto the capacitance touch panel sensor 16 and optionally curing the applied composition. The types of the adhesive layer sheet and adhesive layer forming composition to be used are not particularly limited as long as the upper adhesive layer 18 to be formed satisfies the foregoing properties.

Next, the capacitance touch panel sensor 16 is bonded onto the protective substrate 20. Any known bonding method may be applied.

Next, the above-described method of forming the upper adhesive layer 18 can be used as the method of forming the lower adhesive layer 14 on the capacitance touch panel sensor 16.

Then, the display 12 is bonded onto the lower adhesive layer 14, whereby a desired touch panel can be manufactured.

The above description mentions the methods of forming the respective layers starting from the capacitance touch panel sensor 16 but the manufacturing method is not limited to this method. A desired touch panel can also be manufactured, for example, by preparing in advance a laminate A including a capacitance touch panel sensor 16, a lower adhesive layer 14 and a display 12, separately preparing a laminate B including a protective substrate 20 and an upper adhesive layer 18, and bonding the laminate A and the laminate B together.

Pressure degassing treatment and bonding in a vacuum environment may also be appropriately performed.

The capacitance touch panel according to the invention is less likely to cause malfunctions in a wide usage environment from low temperatures to high temperatures as described above.

The size of the capacitance touch panel is not particularly limited and the display screen of the display preferably has a size in its diagonal direction of at least 5 inches and more preferably at least 10 inches in order to meet the demand for a larger screen size. The capacitance touch panel according to the invention is less likely to cause malfunctions even when the size is within the foregoing range. Usually, the size in the diagonal direction of the input region capable of detecting contact of an object with the capacitance touch panel sensor is also changed according to the size in the diagonal direction of a displayed image. The input region having the foregoing size has a rectangular shape.

In particular, the capacitance touch panel of the invention is less likely to cause malfunctions due to environmental changes even if the display screen is large (the size in the diagonal direction is 5 inches or more). In general, an increase in display screen size leads to an increase in drive frequency (number of scans) and a decrease in capacitance, consequently increasing influence of the parasitic capacitance of the adhesive layer and easily causing malfunctions. However, since the adhesive layer has a small change in relative permittivity according to the capacitance touch panel of the invention, even in a case where the display screen is large, the deviation from an initially set capacitance value is small and malfunctions are less likely to occur.

EXAMPLES

The invention will be described below in further detail by way of examples. However, the invention should not be construed as being limited to the following examples.

Synthesis Example 1

Adhesive 1

UC-1 (polyisoprene methacrylate oligomer; molecular weight: 25,000) (22.7 parts by weight), QM657 (dicyclopentenyloxyethyl methacrylate) (22.7 parts by weight), HOB (2-hydroxybutyl methacrylate) (1.7 parts by weight), Polyoil 110 (liquid polybutadiene) (35.5 parts by weight), L-LIR (liquid polyisoprene) (14.2 parts by weight), Lucirin TPO (2,4,6-trimethylbenzoylphenylethoxyphosphine oxide) (1.1 parts by weight), Irgacure 184 (1-hydroxy-cyclohexyl-phenyl-ketone) (1.7 parts by weight), Karenz PE-01 (pentaerythritol tetrakis(3-mercaptobutyrate) (0.3 parts by weight), and Tinuvin 123 (bis[1-(octyloxy)-2,2,6,6-tetramethyl-4-piperidinyl]sebacate) (0.56 parts by weight) were blended in predetermined amounts (weight basis) to prepare an adhesive 1.

Synthesis Example 2

Adhesive 2

Into 100 parts by weight of an acrylic adhesive base compound containing 4.5 wt % of 4-hydroxybutyl acrylate units (4-HBA), 60 wt % of butyl acrylate units and 35.5 wt % of methyl acrylate units, were blended 0.3 parts by weight of a tolylene diisocyanate compound (Coronate L manufactured by Nippon Polyurethane Industry Co., Ltd.) serving as a crosslinking agent, 0.7 parts by weight of pentaerythritol tetrakis(3-(3,5-di-t-butyl-4-hydroxyphenyl) propionate) (IRGANOX 1010 manufactured by BASF Japan Ltd.) serving as a hindered phenol antioxidant, and 0.5 parts by weight of tris(2,4-di-t-butylphenyl)phosphite (IRGAFOS 168 manufactured by BASF Japan Ltd.) serving as a phosphorus antioxidant to obtain a composition (carboxy group content: 0 wt %).

The resulting composition was applied by a knife coater to a first release sheet [38μ RL-07(2) manufactured by Oji Specialty Paper Co., Ltd.] having a release agent layer on one surface of a polyethylene terephthalate film and heated at 100° C. for 3 minutes to form an adhesive layer.

To the adhesive layer was bonded a second release sheet [38μ RL-07(L) manufactured by Oji Specialty Paper Co., Ltd.] in which a release agent layer having higher release properties than the first release sheet was formed on one surface of a polyethylene terephthalate film, thereby obtaining an adhesive 2 (double-sided adhesive sheet).

Synthesis Example 3

Adhesive 3

An ester formed from a maleic anhydride adduct of a polyisoprene polymer and 2-hydroxyethyl methacrylate (trade name: UC102; Kuraray Co., Ltd.; molecular weight: 12,500) (40 parts by weight), dicyclopentenyloxyethyl methacrylate (trade name: FA512M; Hitachi Chemical Co., Ltd.) (35 parts by weight), 2-hydroxypropyl methacrylate (trade name: LIGHT ESTER HOP; Kyoeisha Chemical Co., Ltd.) (3 parts by weight), acrylomorpholine (trade name: ACMO; Kohjin Co., Ltd.) (3 parts by weight), benzyl acrylate (trade name: Viscoat#160; Osaka Organic Chemical Industry Ltd.) (15 parts by weight), hydrogenated terpene resin (trade name: Clearon P-85; Yasuhara Chemical Co, Ltd.) (35 parts by weight), a butadiene polymer (trade name: Polyoil 110; Zeon Corporation) (120 parts by weight), a hindered phenol antioxidant (trade name: IRGANOX 1520L; Ciba Specialty Chemicals Inc.) (0.3 parts by weight), a photopolymerization initiator (trade name: Speed-Cure TPO; Nihon Siber Hegner K.K.) (0.5 parts by weight), and a photopolymerization initiator (trade name: IRGA-CURE 184D; Ciba Specialty Chemicals Inc.) (4 parts by weight) were kneaded in a kneader to prepare an adhesive 3.

Synthesis Example 4

Adhesive 4

An acrylic copolymer of a monomer containing an acrylic acid ester having a UV crosslinkable site was synthesized. The acrylic copolymer was prepared so that the ratio of BA (n-butyl acrylate)/IBXA (isobornyl acrylate)/HEA (2-hydroxyethyl acrylate)/AEBP (4-acryloyloxyethoxybenzophenone) was 50.0/25.0/25.0/0.20 (parts by weight) and diluted with methyl ethyl ketone (MEK) so as to have a monomer concentration of 40 wt %. V-65 serving as an initiator was added to the monomer ingredients so as to have an amount of 0.4 wt %, which was followed by purging with nitrogen for 10 minutes. Subsequently, the foregoing ingredients were reacted in a temperature-controlled bath at 50° C. for 24 hours to obtain a transparent viscous solution.

Next, the polymer solution was applied onto a release film (heavy-release surface of Cerapeel MIB(T) manufactured by Toray Advanced Film Co., Ltd.) with a thickness of 50 μm by adjusting the knife coater gap to 120 μm and dried in an oven at 100° C. for 8 minutes. The thickness of the dried adhesive was 30 μm. Subsequently, a release film (Purex (registered trademark) A-31 manufactured by Teijin DuPont Films Japan Limited) with a thickness of 38 μm was laminated on the adhesive surface to obtain an adhesive 4 (transfer adhesive sheet).

Synthesis Example 5

Adhesive 5

Isobornyl acrylate (SR506) (44.38 wt %), 1-hydroxycyclohexyl phenyl ketone (Irgacure (registered trademark) 184) (1.6 wt %), pentaerythritol tetrakis(3-mercaptopropionate) PETAMAP (7.60 wt %), and an aliphatic urethane diacrylate (Ebecryl (registered trademark) 230) (46.42 wt %) were blended in predetermined amounts (weight basis) to prepare an adhesive 5.

Synthesis Example 6

Adhesive 6

Isobornyl acrylate (SR506) (42.16 wt %), 1-hydroxycyclohexyl phenyl ketone (Irgacure (registered trademark) 184) (1.52 wt %), pentaerythritol tetrakis(3-mercaptopropionate) PETAMAP (7.22 wt %), an aliphatic urethane diacrylate (Ebecryl (registered trademark) 230) (44.10 wt %) and fumed silica (DeGussa A200) (5 wt %) were blended in predetermined amounts (weight basis) to prepare an adhesive 6.

Synthesis Example 7

Adhesive 7

In a reaction vessel equipped with a stirrer for preparing acrylic copolymers, a reflux condenser, a thermometer, a dropping funnel and a nitrogen gas inlet, n-butyl acrylate (87.0 parts by weight), cyclohexyl acrylate (10.0 parts by weight), 2-hydroxyethyl acrylate (3.0 parts by weight) and 2,2'-azobisisobutyronitrile (0.2 parts by weight) serving as a polymerization initiator were dissolved in ethyl acetate (100 parts by weight). After purging with nitrogen, the solution was polymerized at 80° C. for 8 hours to obtain an acrylic copolymer (A1) having a weight-average molecular weight of 900,000.

In a reaction vessel equipped with a stirrer for preparing acrylic copolymers, a reflux condenser, a thermometer, a dropping funnel and a nitrogen gas inlet, cyclohexylmethyl methacrylate (95.0 parts by weight), dimethylaminoethyl methacrylate (5.0 parts by weight) and 2,2'-azobisisobutyronitrile (1.0 parts by weight) serving as a polymerization initiator were dissolved in ethyl acetate (100 parts by weight). After purging with nitrogen, the solution was polymerized at 80° C. for 8 hours to obtain a methacrylic copolymer (B1) having a weight-average molecular weight of 20,000.

To the acrylic copolymer (A1) (100 parts by weight) was added the methacrylic copolymer (B1) (2.5 parts by weight) and the mixture was diluted with ethyl acetate to obtain an adhesive (P1) having a resin solid content of 30 wt %.

To the adhesive (P1) (100 parts by weight) was added an isocyanate crosslinking agent (D-160N manufactured by Mitsui Chemicals Polyurethanes, Inc.; solid content: 75 wt %) (0.1 parts by weight) and the mixture was stirred for 15 minutes. Then, a polyester film with a thickness of 50 μm, one surface of which had been subjected to release treatment with a silicone compound (this film is hereinafter referred to as "#75 release film"), was coated with the adhesive so that the adhesive had a thickness of 25 μm after drying, which was followed by drying at 75° C. for 5 minutes. The resulting adhesive sheet and a polyester film with a thickness of 38 μm, one surface of which had been subjected to release treatment with a silicone compound (this film is hereinafter referred to as "#38 release film"), were bonded together. Then, the thus bonded sheet and film were aged at 23° C. for 7 days to obtain an adhesive 7 (adhesive sheet having no base) with a thickness of 25 μm and a gel fraction of 75%.

Synthesis Example 8

Adhesive 8

The procedure of Synthesis Example 1 was repeated except that the amount of UC-1 used was changed from 22.7 parts by weight to 35.5 parts by weight and the amount of Polyoil 110 used was changed from 35.5 parts by weight to 22.7 parts by weight, thereby preparing an adhesive 8.

Synthesis Example 9

Adhesive 9

2-Ethylhexyl acrylate (29.5 parts by weight), 2-hydroxyethyl acrylate (1.0 parts by weight), isobornyl acrylate (63 parts by weight), dodecyl acrylate (4.9 parts by weight), an isophorone diisocyanate adduct (reaction product of isophorone diisocyanate with trimethylolpropane; Mitsui Chemicals, Inc.; trade name: Takenate D-140N) (0.8 parts by weight) and IRGACURE 184 (BASF) (0.6 parts by weight) were mixed to obtain a solution.

The resulting solution was applied onto a PET release film and a release surface of another PET release film was bonded onto the applied solution. A high-pressure mercury UV lamp (deep UV lamp UXM-501MD manufactured by Ushio Inc.) was used to irradiate a sample sandwiched between the PET release films with UV light so that the irradiation energy was 3 J/cm$^2$ and the sample was further subjected to heat curing at 40° C. for 3 days to obtain an adhesive 9 (transfer adhesive sheet).

Synthesis Example 10

Adhesive 10

2-Ethylhexyl acrylate (29.5 parts by weight), hexamethylene diacrylate (1.0 parts by weight), isobornyl acrylate (63.0 parts by weight), dodecyl acrylate (4.9 parts by weight), an isophorone diisocyanate adduct (reaction product of isophorone diisocyanate with trimethylolpropane; Mitsui Chemicals, Inc.; trade name: Takenate D-140N) (1.0 parts by weight) and IRGACURE 184 (BASF) (0.6 parts by weight) were mixed to obtain a solution.

The resulting solution was applied onto a PET release film and a release surface of another PET release film was bonded onto the applied solution. A high-pressure mercury UV lamp (deep UV lamp UXM-501MD manufactured by Ushio Inc.) was used to irradiate a sample sandwiched between the PET release films with UV light so that the irradiation energy was 3 J/cm$^2$ and the sample was further subjected to heat curing at 40° C. for 3 days to obtain an adhesive 10 (transfer adhesive sheet).

Synthesis Example 11

Adhesive 11

2-Ethylhexyl acrylate (47 parts by weight), isobornyl acrylate (93 parts by weight), dodecyl acrylate (14 parts by weight), hydroxyethyl acrylate (1.6 parts by weight) and ethyl acetate (127 parts by weight) were mixed and the mixture was stirred at 90° C. for 15 minutes under a nitrogen stream to remove oxygen in the system. Subsequently, azobisisobutyronitrile (0.04 parts by weight) was added and the mixture was stirred at 90° C. for 3 hours. Azobisisobutyronitrile (0.04 parts by weight) and ethyl acetate (132 parts by weight) were further added and the mixture was stirred at 90° C. for 2 hours to obtain an acrylic polymer solution.

To the resulting acrylic polymer solution (10 parts by weight) was added an isophorone diisocyanate adduct (reaction product of isophorone diisocyanate with trimethylolpropane; Mitsui Chemicals, Inc.; trade name: Takenate D-140N) (0.08 parts by weight) and the mixture was fully stirred. Then, the acrylic polymer solution was applied onto a PET release film and heated at 100° C. for 3 minutes to remove the solvent. Then, another PET release film was laminated onto the upper surface and allowed to stand at 40° C. for 3 days to obtain an adhesive 11 (transfer adhesive sheet).

Synthesis Example 12

Adhesive 12

2-Ethylhexyl acrylate (47.2 parts by weight), isobornyl acrylate (42.3 parts by weight), 2-hydroxyethyl acrylate (1.0 parts by weight), dodecyl acrylate (7.9 parts by weight), an isophorone diisocyanate adduct (reaction product of isophorone diisocyanate with trimethylolpropane; Mitsui Chemicals, Inc.; trade name: Takenate D-140N) (1.0 parts by weight) and IRGACURE 184 (BASF) (0.6 parts by weight) were mixed to obtain a solution.

The resulting solution was applied onto a PET release film and a release surface of another PET release film was bonded onto the applied solution. A high-pressure mercury UV lamp (deep UV lamp UXM-501MD manufactured by Ushio Inc.) was used to irradiate a sample sandwiched between the PET release films with UV light so that the irradiation energy was 3 J/cm$^2$ and the sample was further subjected to heat curing at 40° C. for 3 days to obtain an adhesive 12 (transfer adhesive sheet).

Synthesis Example 13

Adhesive 13

2-Ethylhexyl acrylate (47.2 parts by weight), isobornyl acrylate (42.3 parts by weight), hexamethylene diacrylate (1.0 parts by weight), dodecyl acrylate (7.9 parts by weight), an isophorone diisocyanate adduct (reaction product of isophorone diisocyanate with trimethylolpropane; Mitsui Chemicals, Inc.; trade name: Takenate D-140N) (1 part by weight) and IRGACURE 184 (BASF) (0.6 parts by weight) were mixed to obtain a solution.

The resulting solution was applied onto a PET release film and a release surface of another PET release film was bonded onto the applied solution. A high-pressure mercury UV lamp (deep UV lamp UXM-501MD manufactured by Ushio Inc.) was used to irradiate a sample sandwiched between the PET release films with UV light so that the irradiation energy was 3 J/cm$^2$ and the sample was further subjected to heat curing at 40° C. for 3 days to obtain an adhesive 13 (transfer adhesive sheet).

Synthesis Example 14

Adhesive 14

2-Ethylhexyl acrylate (70 parts by weight), isobornyl acrylate (70 parts by weight), dodecyl acrylate (14 parts by weight), hydroxyethyl acrylate (1.6 parts by weight) and ethyl acetate (127 parts by weight) were mixed and the mixture was stirred at 90° C. for 15 minutes under a nitrogen stream to remove oxygen in the system. Subsequently, azobisisobutyronitrile (0.04 parts by weight) was added and the mixture was stirred at 90° C. for 3 hours. Azobisisobutyronitrile (0.04 parts by weight) and ethyl acetate (132 parts by weight) were further added and the mixture was stirred at 90° C. for 2 hours to obtain an acrylic polymer solution.

To the resulting acrylic polymer solution (10 parts by weight) was added an isophorone diisocyanate adduct (reaction product of isophorone diisocyanate with trimethylolpropane; Mitsui Chemicals, Inc.; trade name: Takenate D-140N) (0.080 parts by weight) and the mixture was fully stirred. Then, the acrylic polymer solution was applied onto a PET release film and heated at 100° C. for 3 minutes to remove the solvent. Then, another PET release film was laminated onto the upper surface and allowed to stand at 40° C. for 3 days to obtain an adhesive 14 (transfer adhesive sheet).

The total urethane group/urea group content, the hydroxyl group content and the carboxylic acid group content in the (meth)acrylic polymer in each of the adhesives 1 to 14 with respect to 100 g of the adhesive are shown below.

| | Total amount of urethane groups and urea groups (mmol) | Hydroxyl group (mmol) | Carboxylic acid group (mmol) |
|---|---|---|---|
| Adhesive 1 | | | 5.4 |
| Adhesive 2 | 5.3 | 26.1 | |
| Adhesive 3 | | 8.1 | 1.8 |
| Adhesive 4 | | 214.0 | |
| Adhesive 5 | 297.0 | | |
| Adhesive 6 | 282.2 | | |
| Adhesive 7 | 7.7 | 21.1 | |
| Adhesive 8 | | | 6.2 |
| Adhesive 9 | 7.9 | 4.7 | |
| Adhesive 10 | 2.2 | | |
| Adhesive 11 | | 8.6 | |
| Adhesive 12 | 7.9 | 4.7 | |
| Adhesive 13 | 2.2 | | |
| Adhesive 14 | 6.3 | 5.2 | |

Examples 1 to 19 and Comparative Examples 1 to 4

Preparation of Silver Halide Emulsion

To a fluid 1 (see below) held at 38° C. and pH 4.5, fluids 2 and 3 (also see below) were added simultaneously with stirring in amounts that were equivalent to 90% of their feeds over a period of 20 minutes to form core particles with a diameter of 0.16 μm. Subsequently, fluids 4 and 5 (see below) were added over a period of 8 minutes and the remaining 10% of each of fluids 2 and 3 was then added over a period of 2 minutes, whereupon the particles grew to a size of 0.21 μm. Potassium iodide (0.15 g) was further added and ripening was conducted for 5 minutes to complete the formation of particles.

| Fluid 1: | |
|---|---|
| Water | 750 mL |
| Gelatin | 9 g |
| Sodium chloride | 3 g |
| 1,3-Dimethylimidazolidine-2-thione | 20 mg |
| Sodium benzenethiosulfonate | 10 mg |
| Citric acid | 0.7 g |
| Fluid 2: | |
| Water | 300 mL |
| Silver nitrate | 150 g |
| Fluid 3: | |
| Water | 300 mL |
| Sodium chloride | 38 g |
| Potassium bromide | 32 g |
| Potassium hexachloroiridate(III) (0.005% KCl, 20% aqueous solution) | 8 mL |
| Ammonium hexachlororhodate (0.001% NaCl, 20% aqueous solution) | 10 mL |
| Fluid 4: | |
| Water | 100 mL |
| Silver nitrate | 50 g |
| Fluid 5: | |
| Water | 100 mL |
| Sodium chloride | 13 g |
| Potassium bromide | 11 g |
| Potassium ferrocyanide | 5 mg |

Thereafter, washing with water was performed by the flocculation method according to the usual manner. Specifically, the temperature was lowered to 35° C. and sulfuric acid was added to lower the pH until a silver halide precipitated (pH was in a range of 3.6±0.2). Then, about 3 L of the supernatant was removed (first wash). After further adding 3 L of distilled water, sulfuric acid was added until the silver halide precipitated. Again, 3 L of the supernatant was removed (second wash). The same operation as the second wash was repeated once more (third wash) to complete the washing and desalting steps. The thus washed and desalted emulsion was adjusted to a pH of 6.4 and a pAg of 7.5, and gelatin (3.9 g), sodium benzenethiosulfonate (10 mg), sodium benzenethiosulfinate (3 mg), sodium thiosulfate (15 mg) and chlorauric acid (10 mg) were added and chemical sensitization was performed at 55° C. to attain an optimum sensitivity; thereafter, 1,3,3a,7-tetraazaindene serving as a stabilizer and PROXEL (trade name; ICI Co., Ltd.) serving as an antiseptic were each added in an amount of 100 mg. The eventually prepared emulsion comprised cubic silver iodochlorobromide particles containing 0.08 mol % of silver iodide, containing 70 mol % of silver chloride and 30 mol % of silver bromide in terms of silver chlorobromide ratio, and having an average particle size of 0.22 μm and a variation coefficient of 9%.

(Preparation of Composition for Forming Photosensitive Layer)

To the foregoing emulsion were added $1.2 \times 10^{-4}$ mol/mol Ag of 1,3,3a,7-tetraazaindene, $1.2 \times 10^{-2}$ mol/mol Ag of hydroquinone, $3.0 \times 10^{-4}$ mol/mol Ag of citric acid, and 0.90 g/mol Ag of 2,4-dichloro-6-hydroxy-1,3,5-triazine sodium salt and the coating liquid was adjusted with citric acid to a pH of 5.6 to obtain a composition for forming the photosensitive layer.

(Photosensitive Layer-Forming Step)

After a polyethylene terephthalate (PET) film with a thickness of 100 μm was subjected to corona discharge treatment, a gelatin layer with a thickness of 0.1 μm was formed as an undercoat layer on each surface of the PET film and an antihalation layer having an optical density of about 1.0 and containing a dye that may be decolorized by an alkali in a developer was further formed on each of the undercoat layers. The foregoing photosensitive layer-forming composition was applied onto each of the antihalation layers and a gelatin layer with a thickness of 0.15 μm was further formed, thereby obtaining a PET film having a photosensitive layer formed on each surface. The resulting film is called "film A." The photosensitive layer formed had a silver content of 6.0 g/m$^2$ and a gelatin content of 1.0 g/m$^2$.

(Exposure/Development Step)

Both the surfaces of the film A were exposed to parallel light from a high-pressure mercury lamp used as a light source via a photomask including detection electrodes (first detection electrodes and second detection electrodes) and lead-out wiring lines (first lead-out wiring lines and second lead-out wiring lines) disposed as shown in FIG. 4. The exposure was followed by development with a developer and further a development process using a fixer (trade name: N3X-R for CN16X, FUJIFILM Corporation). The film A was further rinsed with pure water and dried to obtain a capacitance touch panel sensor, on both surfaces of which the detection electrodes and the lead-out wire lines made of Ag thin wires were formed.

In the resulting capacitance touch panel sensor, the detection electrodes are made up of conductive thin wires intersecting in a mesh-like manner. As described above, the first detection electrodes are those extending in the X direction, whereas the second detection electrodes are those extending in the Y direction, these electrodes spaced apart from each other on the film at a pitch of 4.5 to 5.0 mm.

Next, a touch panel including a liquid crystal display, a lower adhesive layer (thickness: 200 μm), the capacitance touch panel sensor, an upper adhesive layer (thickness: 75 μm) and a glass substrate was prepared. The type of the adhesive selected from among the adhesives 1 to 14 (adhesive sheets and liquid compositions) for use in the manufacture of the lower adhesive layer and the upper adhesive layer in each of Examples and Comparative Examples as well as the size of the display screen are compiled in Table 1 below. The touch panel was synthesized by appropriately adjusting the thicknesses of the adhesive sheets so as to have desired thicknesses according to the positions where the adhesive sheets were to be used (upper adhesive layer, lower adhesive layer).

As for the touch panel manufacturing method, in a case where an adhesive sheet was used to form the upper adhesive layer on the capacitance touch panel sensor, the adhesive sheet was cut out to the same size and bonded to the capacitance touch panel sensor with a roller having a weight of 2 kg and the glass protective substrate of the same size was further bonded onto the upper adhesive layer also using a roller having a weight of 2 kg. Alternatively in a case where a liquid was used to form the upper adhesive layer, a suitable amount of the liquid (so-called OCR) was dropped on the capacitance touch panel sensor to a specified film thickness. Then, the capacitance touch panel sensor was bonded to the glass protective substrate so that the liquid was spread out to have a specified film thickness and the liquid was cured by exposure to a specified dose of UV radiation.

The capacitance touch panel sensor was bonded to the liquid crystal display (diagonal size of the display screen: 10 inches) by the same method as above and an adhesive sheet or a liquid was used for the lower adhesive layer.

Each adhesive sheet bonding was followed by degassing through an autoclave treatment at 40° C. and 5 atm for 20 minutes and in a case where a liquid (so-called OCR) was used for bonding, bonding was performed in a vacuum environment to prepare the touch panel.

(Sample Preparation for Temperature Dependency Evaluation Test)

The adhesives shown in Table 1 were used to prepare samples for the temperature dependency evaluation test.

In a case where the adhesive used was a liquid (so-called OCR), the adhesive was applied onto an aluminum substrate having a size of 20 mm in length, 20 mm in width and 0.5 mm in thickness to a coating thickness of 100 to 500 μm and cured by exposure to DV light under recommended conditions, which was followed by bonding of another aluminum substrate (20 mm in length, 20 mm in width, 0.5 mm in thickness) onto the thus formed adhesive layer. Then, pressure degassing treatment was performed at 5 atm and 40° C. for 60 minutes.

In a case where the adhesive used was an adhesive sheet (so-called OCA), the sheet was adjusted to have a thickness of 100 to 500 μm and sandwiched between aluminum substrates as described above, which was followed by pressure degassing treatment to prepare a sample.

The thickness of the adhesive layer in each sample was calculated by measuring the thickness of each sample for the temperature dependency evaluation test with a micrometer at five positions and subtracting the thickness of the two aluminum substrates from the average of the five measurements.

(Method of Temperature Dependency Evaluation Test)

Each of the thus prepared samples for the temperature dependency evaluation test was used to measure the impedance at 1 MHz with an impedance analyzer (4294A manufactured by Agilent Technologies), thereby measuring the relative permittivity of the adhesive layer.

To be more specific, the temperature of the samples for the temperature dependency evaluation test was stepwise increased in increments of 20° C. from −40° C. to 80° C. and the capacitance C was determined at each temperature by the impedance measurement at 1 MHz using the impedance analyzer (4294A manufactured by Agilent Technologies). At each temperature, the samples were allowed to stand for 5 minutes until the temperature was kept constant.

Then, the determined capacitance C was used to calculate the relative permittivity at each temperature according to the following expression (X):

Relative permittivity=(capacitance $C$×thickness $T$)/ (area $S$×vacuum permittivity $\epsilon_0$). Expression (X):

The thickness T refers to the thickness of the adhesive layer, the area S to the area (20 mm in length by 20 mm in width) of the aluminum electrodes, and the vacuum permittivity $\epsilon_0$ to a physical constant ($8.854 \times 10^{-12}$ F/m).

A minimum value and a maximum value were selected from the calculated relative permittivity values to determine the temperature dependency (%) from the expression: [{(maximum value−minimum value)/minimum value}× 100].

Temperature adjustment was performed using a liquid nitrogen cooling stage at low temperatures and using a hot plate at high temperatures.

(Method of Evaluating Incidence of Malfunctions)

The temperature of each touch panel prepared above was stepwise increased in increments of 20° C. from −40° C. to 80° C. and the incidence of malfunctions upon touching at each temperature was measured. To be more specific, the touch panel was touched 100 times at any positions in environments of −40° C., −20° C., 0° C., 20° C., 40° C., 60° C. and 80° C., and the incidence of malfunctions (%) of the touch panel [(the number of times the touch panel did not normally respond/100)×100] was measured from the number of times the touch panel did not normally respond.

The maximum value was selected from the measurements of the incidence of malfunctions at the respective temperatures and the sample was rated as "OK" when the value was up to 5% and as "NG" when the value was more than 5%.

In Table 1, "Maximum value of incidence of malfunctions" is the maximum value of the measurements of the incidence of malfunctions at the respective temperatures.

In Table 1, the field of "Display screen size" refers to the display screen size of each display. In each of Examples and Comparative Examples, the size in the diagonal direction of the input region capable of detecting contact of an object with the capacitance touch panel sensor is also the same as the display screen size.

"Relative permittivity (minimum value)" in the field of "Upper adhesive layer" in Table 1 refers to the minimum value of the relative permittivity A of the upper adhesive layer at the respective temperatures as obtained by performing the foregoing temperature dependency evaluation test. "Relative permittivity (maximum value)" in the field of "Lower adhesive layer" refers to the maximum value of the relative permittivity B of the lower adhesive layer at the respective temperatures as obtained by performing the foregoing temperature dependency evaluation test.

In Examples 1 to 19, the relative permittivity A of the upper adhesive layer at the respective temperatures as obtained by performing the foregoing temperature dependency evaluation test was equal to or larger than the relative permittivity B of the lower adhesive layer at the respective temperatures as obtained by performing the foregoing temperature dependency evaluation test.

TABLE 1

| | | Upper adhesive layer | | | Lower adhesive layer | | | | |
|---|---|---|---|---|---|---|---|---|---|
| | Display screen size (inch) | Adhesive type | Relative permittivity (minimum value) | Temperature dependency | Adhesive type | Relative permittivity (maximum value) | Temperature dependency | Maximum value of incidence of malfuncions | Rating |
| Example 1 | 10 | Adhesive 1 | 2.8 | 7% | Adhesive 3 | 2.8 | 4% | 1% | OK |
| Example 2 | 10 | Adhesive 1 | 2.8 | 7% | Adhesive 8 | 2.2 | 10% | 2% | OK |
| Example 3 | 5 | Adhesive 1 | 2.8 | 7% | Adhesive 3 | 2.8 | 4% | 0% | OK |
| Example 4 | 10 | Adhesive 8 | 2.0 | 10% | Adhesive 1 | 3.0 | 7% | 3% | OK |

TABLE 1-continued

|  | Display screen size (inch) | Upper adhesive layer | | | Lower adhesive layer | | | Maximum value of incidence of malfuncions | Rating |
|---|---|---|---|---|---|---|---|---|---|
|  |  | Adhesive type | Relative permittivity (minimum value) | Temperature dependency | Adhesive type | Relative permittivity (maximum value) | Temperature dependency | | |
| Example 5 | 10 | Adhesive 9 | 2.7 | 30% | Adhesive 3 | 2.8 | 4% | 4% | OK |
| Example 6 | 10 | Adhesive 10 | 2.7 | 30% | Adhesive 3 | 2.8 | 4% | 4% | OK |
| Example 7 | 10 | Adhesive 11 | 2.7 | 30% | Adhesive 3 | 2.8 | 4% | 4% | OK |
| Example 8 | 10 | Adhesive 12 | 2.4 | 25% | Adhesive 3 | 2.8 | 4% | 3% | OK |
| Example 9 | 10 | Adhesive 13 | 2.4 | 25% | Adhesive 3 | 2.8 | 4% | 3% | OK |
| Example 10 | 10 | Adhesive 14 | 2.4 | 25% | Adhesive 3 | 2.8 | 4% | 3% | OK |
| Example 11 | 10 | Adhesive 9 | 2.7 | 30% | Adhesive 12 | 3.0 | 25% | 5% | OK |
| Example 12 | 10 | Adhesive 10 | 2.7 | 30% | Adhesive 12 | 3.0 | 25% | 5% | OK |
| Example 13 | 10 | Adhesive 11 | 2.7 | 30% | Adhesive 12 | 3.0 | 25% | 5% | OK |
| Example 14 | 10 | Adhesive 9 | 2.7 | 30% | Adhesive 13 | 3.0 | 25% | 5% | OK |
| Example 15 | 10 | Adhesive 10 | 2.7 | 30% | Adhesive 13 | 3.0 | 25% | 5% | OK |
| Example 16 | 10 | Adhesive 11 | 2.7 | 30% | Adhesive 13 | 3.0 | 25% | 5% | OK |
| Example 17 | 10 | Adhesive 9 | 2.7 | 30% | Adhesive 14 | 3.0 | 25% | 5% | OK |
| Example 18 | 10 | Adhesive 10 | 2.7 | 30% | Adhesive 14 | 3.0 | 25% | 5% | OK |
| Example 19 | 10 | Adhesive 11 | 2.7 | 30% | Adhesive 14 | 3.0 | 25% | 5% | OK |
| Comparative Example 1 | 10 | Adhesive 4 | 3.1 | 48% | Adhesive 5 | 4.7 | 52% | 19% | NG |
| Comparative Example 2 | 10 | Adhesive 7 | 2.7 | 41% | Adhesive 1 | 3.0 | 7% | 10% | NG |
| Comparative Example 3 | 10 | Adhesive 2 | 3.8 | 71% | Adhesive 6 | 3.6 | 33% | 15% | NG |
| Comparative Example 4 | 5 | Adhesive 4 | 3.1 | 48% | Adhesive 5 | 4.7 | 52% | 7% | NG |

In Comparative Examples 1, 2 and 4, the foregoing expression (1) was not satisfied at some of the respective temperatures. In other words, the relative permittivity of the upper adhesive layer was smaller than that of the lower adhesive layer at some of the respective temperatures.

As is shown in Table 1, it was confirmed that the touch panel of the invention is less likely to cause malfunctions over a range from low temperatures to high temperatures. As is seen from the comparison between Examples 1 to 10 and the other Examples, it was confirmed that malfunctions are much less likely to occur when one of the temperature dependency of the relative permittivity of the upper adhesive layer and that of the lower adhesive layer is up to 20%. In addition, as is seen from the comparison between Examples 1 to 3, it was confirmed that malfunctions are much less likely to occur when the temperature dependency of the relative permittivity of the upper adhesive layer and that of the lower adhesive layer are both up to 20% and when the minimum value of the relative permittivity A of the upper adhesive layer at the respective temperatures set in increments of 20° C. in a range of −40° C. to 80° C. is equal to or larger than the maximum value of the relative permittivity B of the lower adhesive layer at the respective temperatures set in increments of 20° C. in a range of −40° C. to 80° C.

On the other hand, in Comparative Examples 1 to 4 in which the upper adhesive layer and/or the lower adhesive layer showed a higher degree of temperature dependency, malfunctions were more likely to occur and desired effects were not obtained.

What is claimed is:

1. A capacitance touch panel comprising: a display; a lower adhesive layer; a capacitance touch panel sensor; an upper adhesive layer; and a protective substrate, which are formed in this order,
wherein a temperature dependency of relative permittivity in the upper adhesive layer and a temperature dependency of relative permittivity in the lower adhesive layer as determined by a temperature dependency evaluation test are both up to 30%, the temperature dependency evaluation test including sandwiching an adhesive layer between aluminum electrodes, increasing a temperature of the adhesive layer in increments of 20° C. from −40° C. to 80° C., calculating relative permittivity of the adhesive layer at respective temperatures by impedance measurement at 1 MHz, selecting a minimum value and a maximum value from the relative permittivity calculated at the respective temperatures and taking a value (%) determined from an expression [{(maximum value−minimum value)/minimum value}×100] as a temperature dependency.

2. The capacitance touch panel according to claim 1, wherein a display screen of the display has a size in a diagonal direction of 5 inches or more.

3. The capacitance touch panel according to claim 1, wherein a minimum value of the relative permittivity A of the upper adhesive layer at respective temperatures set in increments of 20° C. from −40° C. to 80° C. is equal to or larger than a maximum value of the relative permittivity B of the lower adhesive layer at respective temperatures set in increments of 20° C. from −40° C. to 80° C.

4. The capacitance touch panel according to claim 3, wherein the capacitance touch panel sensor is a laminate having detection electrodes provided on both surfaces of a substrate or a laminate obtained by bonding together, via an adhesive layer, detection electrode-bearing substrates each having detection electrodes formed on a surface of a substrate.

5. The capacitance touch panel according to claim 3, wherein the temperature dependency of the relative permittivity in the upper adhesive layer or the temperature dependency of the relative permittivity in the lower adhesive layer as determined by the temperature dependency evaluation test is up to 20%.

6. The capacitance touch panel according to claim 3, wherein a display screen of the display has a size in a diagonal direction of 5 inches or more.

7. The capacitance touch panel according to claim 1, wherein the capacitance touch panel sensor is a laminate having detection electrodes provided on both surfaces of a substrate or a laminate obtained by bonding together, via an adhesive layer, detection electrode-bearing substrates each having detection electrodes formed on a surface of a substrate.

8. The capacitance touch panel according to claim 7, wherein each of the detection electrodes comprises a material selected from the group consisting of gold, silver, copper, aluminum, ITO, tin oxide, zinc oxide, cadmium oxide, gallium oxide, titanium oxide, an alloy of silver and palladium, and an alloy of silver, palladium and copper.

9. The capacitance touch panel according to claim 8, wherein the temperature dependency of the relative permittivity in the upper adhesive layer or the temperature dependency of the relative permittivity in the lower adhesive layer as determined by the temperature dependency evaluation test is up to 20%.

10. The capacitance touch panel according to claim 8, wherein a display screen of the display has a size in a diagonal direction of 5 inches or more.

11. The capacitance touch panel according to claim 7, wherein the temperature dependency of the relative permittivity in the upper adhesive layer or the temperature dependency of the relative permittivity in the lower adhesive layer as determined by the temperature dependency evaluation test is up to 20%.

12. The capacitance touch panel according to claim 7, wherein a display screen of the display has a size in a diagonal direction of 5 inches or more.

13. The capacitance touch panel according to claim 1, wherein the temperature dependency of the relative permittivity in the upper adhesive layer or the temperature dependency of the relative permittivity in the lower adhesive layer as determined by the temperature dependency evaluation test is up to 20%.

14. The capacitance touch panel according to claim 13, wherein a display screen of the display has a size in a diagonal direction of 5 inches or more.

\* \* \* \* \*